US008935290B2

(12) United States Patent
Ippili et al.

(10) Patent No.: US 8,935,290 B2
(45) Date of Patent: Jan. 13, 2015

(54) USER INTERFACE FEATURES TO MANAGE A LARGE NUMBER OF FILES AND THEIR APPLICATION TO MANAGEMENT OF A LARGE NUMBER OF TEST SCRIPTS

(75) Inventors: Chandra Sekhar Ippili, Vizianagaram Dist (IN); Amit Kumar Trivedi, Lucknow (IN); Satyasri Prabhakar Mantripragada, Srikakulam (IN); Rajesh Vemula, Godavari (IN)

(73) Assignee: Oracle International Corporation, Redwood Shores, CA (US)

( * ) Notice: Subject to any disclaimer, the term of this patent is extended or adjusted under 35 U.S.C. 154(b) by 1501 days.

(21) Appl. No.: 11/309,058

(22) Filed: Jun. 15, 2006

(65) Prior Publication Data

US 2007/0260613 A1  Nov. 8, 2007

(30) Foreign Application Priority Data

May 3, 2006  (IN) .............................. 800/CHE/2006

(51) Int. Cl.
  *G06F 7/00*  (2006.01)
  *G06F 17/30*  (2006.01)

(52) U.S. Cl.
  CPC ................................ *G06F 17/30067* (2013.01)
  USPC ...................................................... 707/791

(58) Field of Classification Search
  None
  See application file for complete search history.

(56) References Cited

U.S. PATENT DOCUMENTS

| | | | |
|---|---|---|---|
| 6,353,448 B1* | 3/2002 | Scarborough et al. | 715/744 |
| 6,718,518 B1* | 4/2004 | Plow et al. | 715/205 |
| 6,754,388 B1* | 6/2004 | Foslien et al. | 382/215 |
| 7,058,624 B2* | 6/2006 | Masters | 707/3 |
| 2004/0068521 A1* | 4/2004 | Haacke et al. | 707/200 |
| 2004/0177067 A1* | 9/2004 | Takeda | 707/3 |
| 2005/0080770 A1* | 4/2005 | Lueder et al. | 707/3 |
| 2005/0177562 A1* | 8/2005 | Raciborski | 707/3 |
| 2006/0004739 A1* | 1/2006 | Anthony et al. | 707/4 |
| 2006/0026147 A1* | 2/2006 | Cone et al. | 707/3 |
| 2006/0069690 A1* | 3/2006 | Patel et al. | 707/100 |
| 2006/0161535 A1* | 7/2006 | Holbrook | 707/3 |

OTHER PUBLICATIONS

Walter Savitch, Problem Solving with C++the Object of Programming, 2001, Third Edition, pp. 647, 918.*

Advanced Find and Replace 2.3 , downloaded from http://www.allworldsoft.com/software/11-820-advanced-find-and-replace.htm, pp. 1-2, 2004.

File Substring Replacement Utility 10.1, http://www.programmersheaven.com/zone16/cat656/21117.htm Programmers Heaven—Development Tools Zone—Search/Replace Tools—fsru101.exe Download page, pp. 1-2, 1996-2006 128K-Communications Ltd.

(Continued)

*Primary Examiner* — Apu Mofiz
*Assistant Examiner* — Thu Nga Nguyen
(74) *Attorney, Agent, or Firm* — Narendra Reddy Thappeta

(57) ABSTRACT

Improved user interface features to manage a large number of files and their application to management of a large number of test scripts. Various features related to selection of files of interest, locating files matching (or not containing) search strings potentially of several lines, highlighting the occurrences of desired strings in the content of a file, finding and replacing strings of interest potentially of several lines, are disclosed.

48 Claims, 31 Drawing Sheets

(56) References Cited

OTHER PUBLICATIONS

Regular—Expressions.info, downloaded from http://www.regular-expressions.info/editpadpro.html, EditPad Pro—Convenient Text Editor with Complete Support for Regular Expressions, pp. 1-3, Sep. 22, 2004, Jan Goyvaerts.

Find and replace text, downloaded from http://help.globalscape.com/help/csb4/csb/F015LT.htm Nov. 16, 2005.

Dreamweaver MX 2004: Using Find and Replace: Text (Advanced), UWEC, downloaded from http://www.uwec.edu/help/Dreamweaver04/fndreplac-advtxt.htm, pp. 1-2, 1995-2006, University of Wisconsin-Eau Claire • Eau Claire.

Useful File Utilities—Information about Replacer, downloaded from http://www.replsoft.com/internal_replacer.html, pp. 1, May 19, 2006, ReplSoft Inc.

Visual SourceSafe—How to: Search for a Text String in Multiple Files, downloaded from http://msdn2.microsoft.com/en- us/library/017ybd7t(d=printer).aspx, p. 1, 2006 Microsoft Corporation.

Automate Test—Overcoming the tast obstacle of automated testing—easy test script maintenance. downloaded from http://www.newmerix.com/products/test.php PeopleSoft Software Testing, pp. 1-2, 2006, Newmerix Corp.

Search and Replace, Chapter 4. Editing Text, downloaded from http://jedit.org/users - guide/search-replace.html Nov. 16, 2005.

TextPipe Pro, Fix Text and Data 500% Faster!—An Automated Text Tool on Steroids!, downloaded from www.crystalsoftware.com.au, Crystal Software, Nov. 16, 2005.

What is a bookmarklet? Propellernet's Bookmarklets/Favelets, for Search Engine Marketing, downloaded from http://web.archive.org/web/20050305151703/http://www.propellernet.co.uk/login/bookmarklets.php, Nov. 16, 2005.

\* cited by examiner

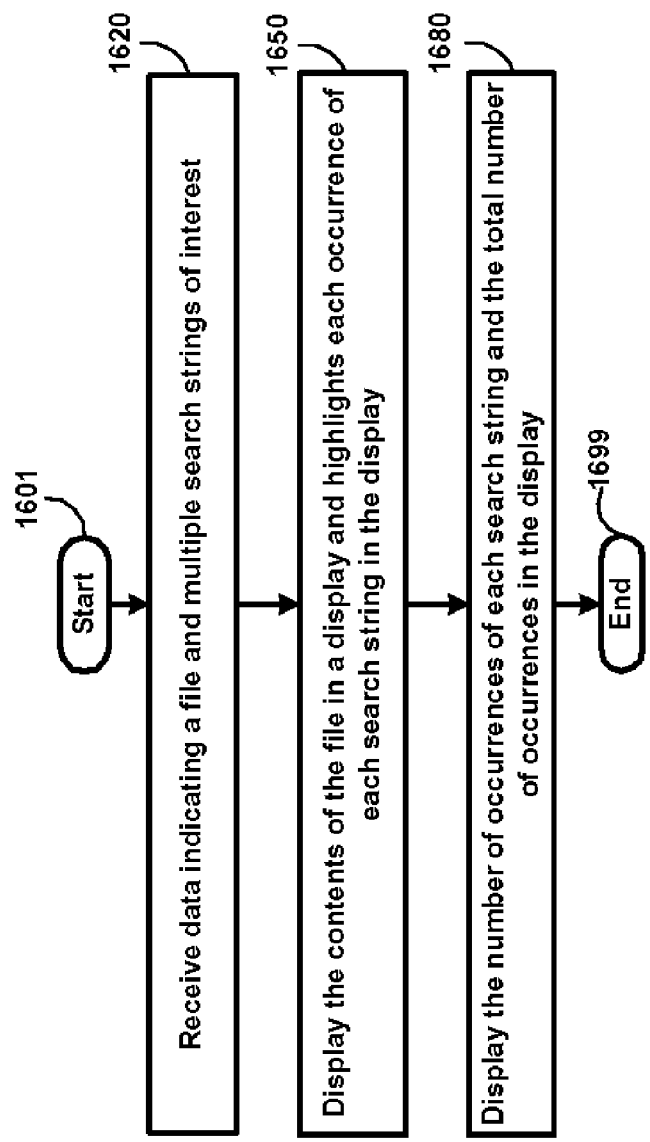

USER INTERFACE FEATURES TO MANAGE A LARGE NUMBER OF FILES AND THEIR APPLICATION TO MANAGEMENT OF A LARGE NUMBER OF TEST SCRIPTS

RELATED APPLICATIONS

The present application is related to and claims priority from the co-pending India Patent Application entitled, "Improved User Interface Features to Manage a Large Number of Files and Their Application to Management of a Large Number of Test Scripts", Serial Number: 800/CHE/2006, Filed: May 3, 2006, naming the same inventors as in the subject patent application.

BACKGROUND OF THE INVENTION

1. Field of the Invention

The present invention relates to management of files, their content, and more specifically to a method and apparatus to provide improved user interface features to manage a large number of files and their application to management of a large number of test scripts.

2. Related Art

User interface refers to the manner in which a user interfaces or communicates with a digital processing system. In general, a computer system would contain equipment such as display unit, a keyboard or mouse, and a software/firmware component controlling the use/operation of the equipment and providing interface features. For example, graphical user interfaces allow the user to interact with the system by manipulating icons or menus, while command-line interfaces allow the user to interact with operating systems by entering commands from the keyboard.

There is a general need to provide user interface features, which can be conveniently used or adapted for various environments of interest.

One place where superior user interface features would be helpful is when a user needs to manage a large number of files and/or their content. The large number of files may be generated by a user application and their maintenance may be performed external to the application. For example, automated testing tools such as WinRunner available from Mercury Interactive Corporation generate a large number of test scripts (text files) containing instructions in a programming language, which are used to test the functionality of a software system. Modifications made to the software system necessitate modifications of the test scripts. Such modifications can be performed directly by manipulating the contents of the test scripts.

What is therefore needed is an approach, which provides improved user interface features to manage a large number of files and their application to management of a large number of test scripts while addressing one or more requirements described above.

BRIEF SUMMARY

See sub-section entitled, "1. Overview" in the "Detailed Description of the Preferred Embodiments" below.

BRIEF DESCRIPTION OF THE DRAWINGS

The present invention will be described with reference to the accompanying drawings briefly described below.

FIG. 16 is a flowchart illustrating the manner in which a user can locate multiple search strings according to an aspect of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

Figure 1:
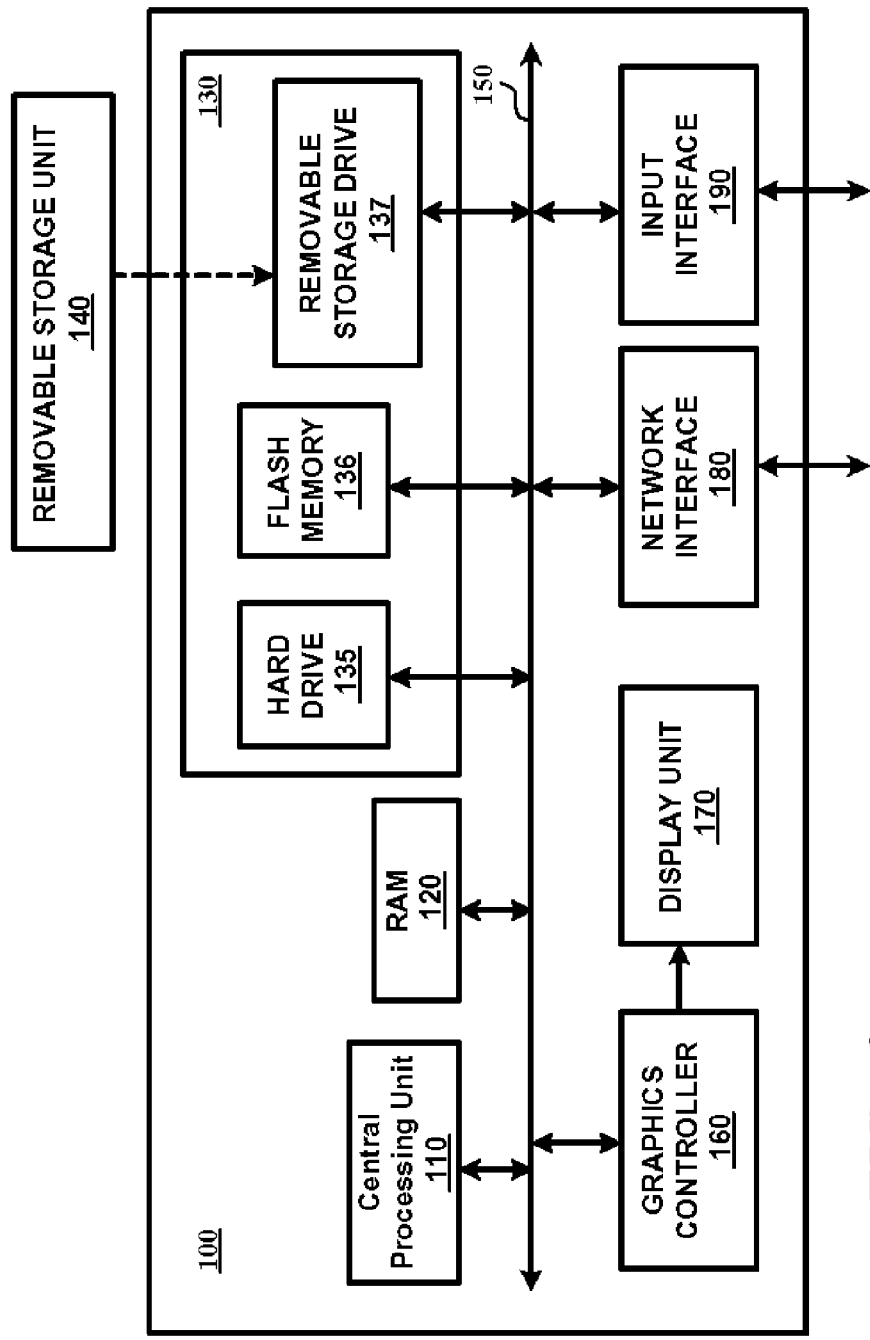
FIG. 1 is a block diagram illustrating the details of a digital processing system in which various aspects of the present invention are operative by execution of appropriate software instructions.

An aspect of the present invention enables a user to locate files in a limited number of directories. The user can specify a path of a search directory and a depth limit indicating the number of levels of subdirectories under the search directory. The files belonging to the search directory and any sub directory of the search directory whose level is within the depth limit are identified. In an embodiment, the file names and/or paths (directories) of the identified files and the number of identified files are displayed in a display.

Another aspect of the present invention enables a user to locate files containing a multi-line search string. The user specifies the directories to be searched and a search string containing multiple lines of text. A multi-line string is generally specified according to a user interface in which each line of the text is displayed in a separate display line. The files containing the search string and belonging to any one of the directories to be searched are identified. In an embodiment, the file names of the identified files and the number of identified files are displayed in a display.

Yet another aspect of the present invention enables a user to locate files not containing a search string. On receiving the directories to be searched and a search string from a user, the files not containing the search string and belonging to any one of the directories to be searched are identified. In an embodiment, the file names of the identified files and the number of identified files are displayed in a display.

One more aspect of the present invention enables a user to search in only a displayed list of files. Initially, a list of files is displayed in a display. On receiving a search string and a flag indicating that the search is to be conducted only in the displayed list of files, the files containing the search string and belonging to the displayed list of files are identified. In an embodiment, the file names of the identified files and the number of identified files are displayed on the display.

Another aspect of present invention enables a user to specify the identifier of a file from a list of files presently displayed. On receiving the identifier (name or path) of a file, the file is marked as selected (awaiting further action such as open/delete the file).

Yet another aspect of the present invention locates the multiple occurrences of a search string containing multiple lines of text in the content of a file. On receiving a file identifier and a search string, the content of the file is displayed in a display and each occurrence of the search string in the content is highlighted with a first appearance (in an embodiment, with a first color). On receiving an indication for changing the highlighting to a second appearance (in the embodiment, with a second color), each highlighted portion is changed to the second appearance. On receiving an indication to remove the highlighting, the appearance of each highlighted portion is removed.

One more aspect of the present invention enables a user to specify a search string from a displayed content of a file. The content of a file is displayed to the user enabling the user to highlight a portion of the displayed content and to indicate that the highlighted portion is to be used as a search string. On receiving the highlighted portion as a search string, the occurrences of matching strings (of the highlighted portion) are identified in the content of the file. The matching strings are highlighted in the display and the number of occurrences is also displayed.

Another aspect of the present invention enables a user to locate multiple search strings at the same time in a content of a file. The user specifies a file to be searched and the multiple search strings. The content of the file is displayed in a display and the occurrences of each of the multiple search strings is highlighted. The number of occurrences of each search string and the total number of occurrences are also displayed. In case identical strings are provided as two separate search strings, the two together may be treated as a single search. In an embodiment, the search string can be specified either as a multi-line text or as individual search strings on each line in the display.

Yet another aspect of the present invention enables a user to substitute a multi-line string with a multi-line replacement string. The user specifies a list of files, a multi-line search string, and a multi-line replacement string. The content of each of the list of files is modified by substituting each occurrence of the search string with the replacement string. In one embodiment, the total number of substitutions performed is displayed.

Another aspect of the present invention enables a user to substitute a multi-line string in a selection of text. On receiving a selection of text (from a content displayed in a display), a multi-line search string and a multi-line replacement string, each occurrence of the search string in the selected text is substituted with the replacement string in the display. The number of substitutions performed is also displayed.

One more aspect of the present invention enables a user to specify multiple search strings. A pre-defined set of search strings is displayed to the user and the user is enabled to select the search strings of interest and to specify corresponding replacement strings. The content of a file (or a list of files) received from the user is modified by substituting each occurrence of each of the selected search strings with the corresponding replacement strings.

Yet another aspect of the present invention enables a user to remove selected files from a list of displayed files (without deleting the files from the physical secondary storage). A list of files is displayed to the user, enabling the user to select a subset of the displayed files that is to be removed from the display. On receiving a command to remove the selected files, the display is updated to show only the files in the first displayed list of files but not in the selected list of files.

Additional aspects of the present invention provide for combination of various features noted above.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Digital Processing System

FIG. 1 is a block diagram illustrating the details of a digital processing system in which various aspects of the present invention are operative by execution of appropriate software instructions. Digital processing system 100 may contain one or more processors such as central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present invention described in the present application. CPU 110 may contain multiple processing units, with each processing unit potentially being designed for a specific task. Alternatively, CPU 110 may contain only a single general purpose-processing unit. RAM 120 may receive instructions from secondary memory 130 using communication path 150.

Graphics controller 160 generates display signals (e.g., in RGB format) to display unit 170 based on data/instructions received from CPU 110. Display unit 170 contains a display screen to display the images defined by the display signals. Display unit 170 may be used to display the dependency information (described below) stored in secondary memory 130. Input interface 190 may correspond to a key-board and/or mouse. Network interface 180 provides connectivity to a network and may be used to communicate with other external systems.

Secondary memory 130 may contain hard drive 135, flash memory 136, and removable storage drive 137. Some or all of the data and instructions may be provided on removable storage unit 140, and the data and instructions may be read and provided by removable storage drive 137 to CPU 110. Secondary memory 130 may be used to store the dependency information generated from the program files (also potentially stored in secondary memory 130). Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer readable storage medium having stored therein computer software and/or data.

In this document, the term "computer program product" is used to generally refer to removable storage unit 140 or hard disk installed in hard drive 135. These computer program products are means for providing software to script maintenance system. CPU 110 may retrieve the software instructions, and execute the instructions to provide various features of the present invention described below. As may be appreciated, many of the aspects are used to manage/maintain test scripts, the digital processing system may be viewed as a script maintenance system in the corresponding examples. Accordingly, the description is continued with respect to a script maintenance system.

3. Enabling a User to Locate Files in a Limited Number of Directories

Figure 2:
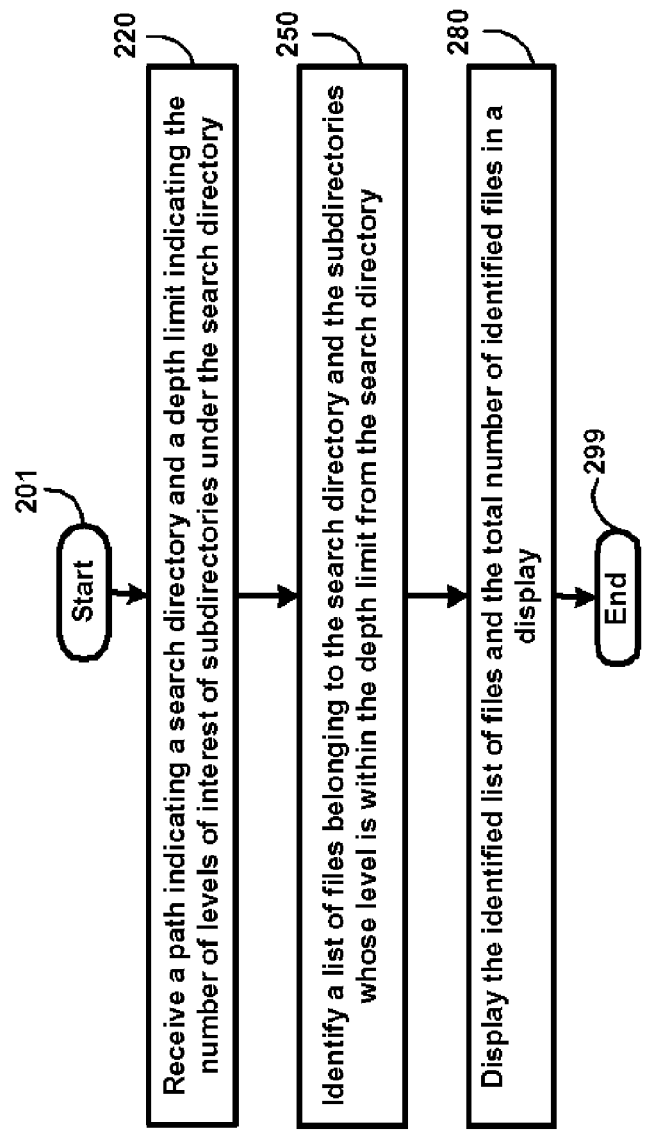
FIG. 2 is a flowchart illustrating the manner in which a user can locate files in a limited number of directories according to an aspect of the present invention.

FIG. 2 is a flowchart illustrating the manner in which a user can locate files in a limited number of directories according to an aspect of the present invention. The flowchart is described with respect to the system of FIG. 1 merely for illustration. However, the features can be implemented in various other environments without departing from the scope and spirit of the present invention. The flowchart begins in step 201, in which control passes to step 220.

In step 220, script maintenance system receives a path indicating a search directory and a depth limit indicating the number of levels of interest of subdirectories under the search directory. In general, a directory (or folder) refers to the name of a group containing a set of (none or more) files and/or a set of groups (directories) with corresponding names. The user can provide the search directory by typing a path or can select the search directory in an interface displaying a hierarchy of directories. The depth limit can also be provided with a convenient convention (e.g., entering the number in a pre-specified location or selecting from a selection box which would display the possible choices of depth limit).

In step 250, script maintenance system identifies a list of files belonging to the search directory and the subdirectories whose level is within the depth limit from the search directory. According to a convention, the level of a directory equals the number of intermediate directories present from a reference directory (in this case the search directory). Thus, all the subdirectories (of the search directory) which have a number of intermediate directories less than or equal to the depth limit, are deemed to be matching for the purpose of identifying the files of step 250.

In step 280, script maintenance system displays the identified list of files on a display in an embodiment of the present invention. Each file may be identified using a path (directory) along with the name of the file. To the extent all files belong to a level of directory, the directory can be displayed in a common area for all the files. However, as some features of the present invention enable files from different directories to be displayed, each file may be conveniently displayed with path and file name combination. Alternative approaches such a representing each file and/or directory by an icon, can also be employed in the display.

It may be appreciated that options may be provided for a user to select whether the name of the file and/or the path (directory) of the identified files are to be displayed. For example, in a test script environment, files are identified using the paths of the files (since the names of the files are identical) and as such an option to display only the paths of the identified files enables a user to quickly locate the file(s) of interest.

Script maintenance system may also display the number of identified files, as shown in area 380. Alternatively, the number of identified files in the search directory and each of the subdirectory may be displayed along with the total number of identified files. In the scenario when the number of identified files is zero (in total or in any one of the directories) an alert message may be displayed to the user. The flowchart ends in step 299.

It should be appreciated that the list identified in step 250 can be used for other purposes (e.g., to provide input for further filtering the displayed list of files). It may be further appreciated that a user may repeat steps 220 and 250 to identify the desired files located in different search directories (and subdirectories within different depth limits), thereby enabling the user to manage a large number of files in an efficient/convenient manner. The features of FIG. 2 are described below with an example user interface.

4. User Interface to Locate Files in a Limited Number of Directories

Figure 3:
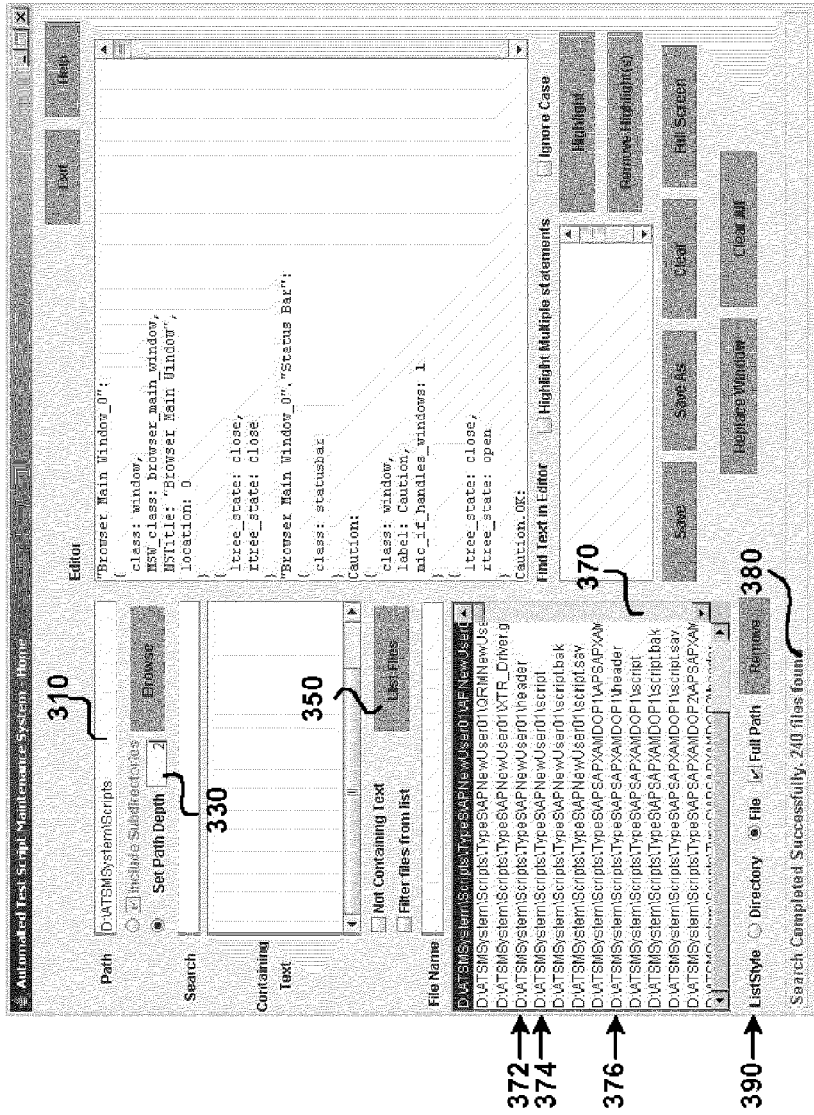
FIG. 3 depicts a user interface to locate files in a limited number of directories in one embodiment.

FIG. 3 depicts a user interface to locate files in a limited number of directories in one embodiment. FIG. 3 contains text field 310 and 330, list files button 350, file list 370 (containing lines 372, 374 and 376), status bar 380, and list style option 390.

A user specifies a search directory ("D:\ATSMSytem\Scripts") by typing a path in text field 310 in step 220. The user then specifies a number (e.g., "2", as shown) in text field 330, indicating the number of levels of interest of subdirectories under the search directory. On clicking list files button 350, script maintenance system identifies a list of files belonging to the search directory and the subdirectories whose level is within the depth limit (as described in detail above with respect to step 250) and displays the identified list of files in file list 370 as per step 280.

The files names of the identified files (along with the paths) are displayed in file list 370 since the user has selected the "File" option in list style option 390. In the scenario when the "Directory" option of list style option 390 is selected, only the paths (without the file names) of the identified files will be displayed in file list 370.

Lines 372 and 374 depict two files belonging to a subdirectory "D:\ATSMSytem\Scripts\TypeS\APNewUser01" which is two levels or intermediate directories from the search directory. Line 376 depicts a file in another subdirectory, which is also at two levels from the search directory. Status bar 380 depicts the total number ("240") of identified files.

5. Enabling a User to Locate Files Containing a Multi-line Search String

Figure 4:
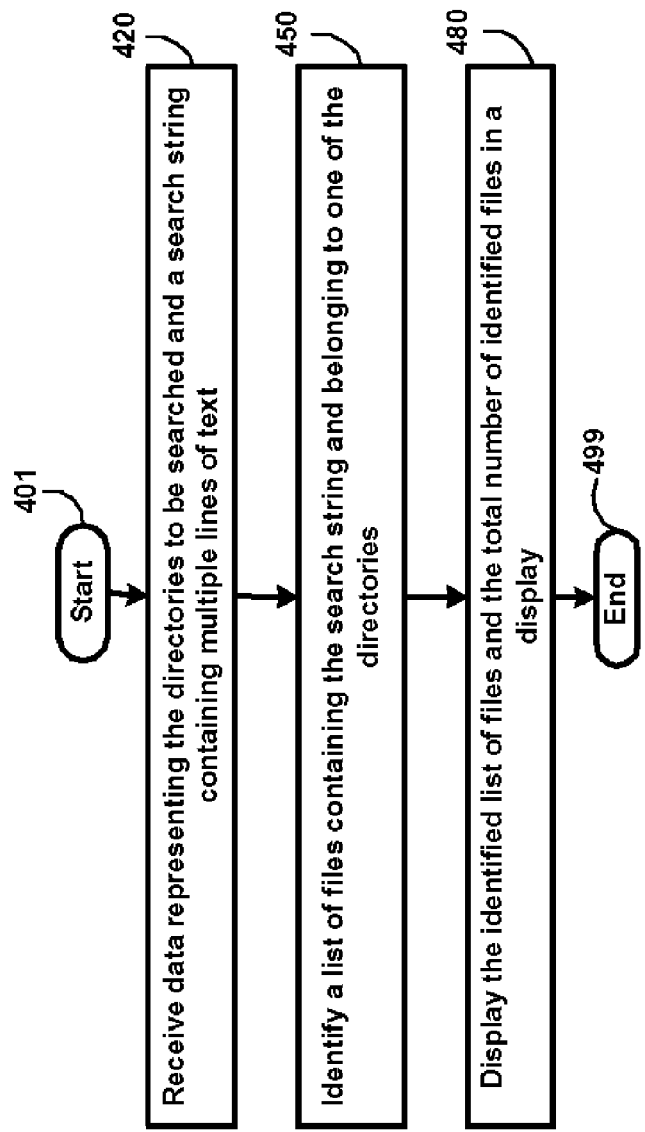
FIG. 4 is a flowchart illustrating the manner in which a user can locate files containing a multi-line search string according to an aspect of the present invention.

FIG. 4 is a flowchart illustrating the manner in which a user can locate files containing a multi-line search string according to an aspect of the present invention. The flowchart is described with respect to the system of FIG. 1 merely for illustration. However, the features can be implemented in various other environments without departing from the scope and spirit of the present invention. The flowchart begins in step 401, in which control passes to step 420.

In step 420, script maintenance system receives data representing the directories to be searched and a search string containing multiple lines of text. The data representing the directories to be searched may be received in one of many ways, for example allowing a user to select the directories to be searched from a displayed list of directories. In the embodiment described below, a user enters a directory and selects an option to include the subdirectories under the search directory thereby specifying the directories to be searched. In an alternative embodiment, a user enters a search directory and depth limit indicating the number of levels of interest of subdirectories under the search directory thereby specifying the directories (as described in detail with respect to FIG. 2) to be searched.

The search string contains multiple lines of text, which are provided according to a user interface in which each line of text is displayed in a corresponding physical line of the display.

In step 450, script maintenance system identifies a list of files containing the search string and belonging to one of the directories. The contents of each of the files belonging to one of the directories to be searched may be broken down into lines and comparison with the multi-line search string may be performed on individual lines.

In step 480, script maintenance system displays the identified list of files and the total number of identified files on a display in an embodiment of the present invention. The identified files (and/or the total number of identified files) may be displayed as per features described above in relation to step 280. The flowchart ends in step 499.

The search feature described above can be implemented in combination with various other features. For example, in all text/content searches, it may be desirable for characters signifying space or tab (in general white space characters) occurring at the beginning and end of each line (of the content of a file and/or search string) to be considered or ignored while doing the comparison. The program instructions may provide a user to specify the desired option(s) and perform search accordingly.

It should be appreciated that several details of the embodiments not pertinent to the features of the invention are not described in this patent application to avoid obscuring the pertinent details. For example, in all text/content searches, it may be desirable for the search to be conducted ignoring the case (upper case or lower case) of the characters in a search string.

In an embodiment described below, the content of a file selected from the list of identified files is displayed to the user, enabling the user to manually verify that the search string is contained in the selected file. The contents of the selected file can be modified and saved to secondary storage thereby providing the user a convenient/efficient way of modifying the contents of different files matching the same criteria (i.e., containing a search string). The features of FIG. 4 are described below with an example user interface.

6. User Interface to Locate Files Containing a Multi-line Search String

Figure 5:
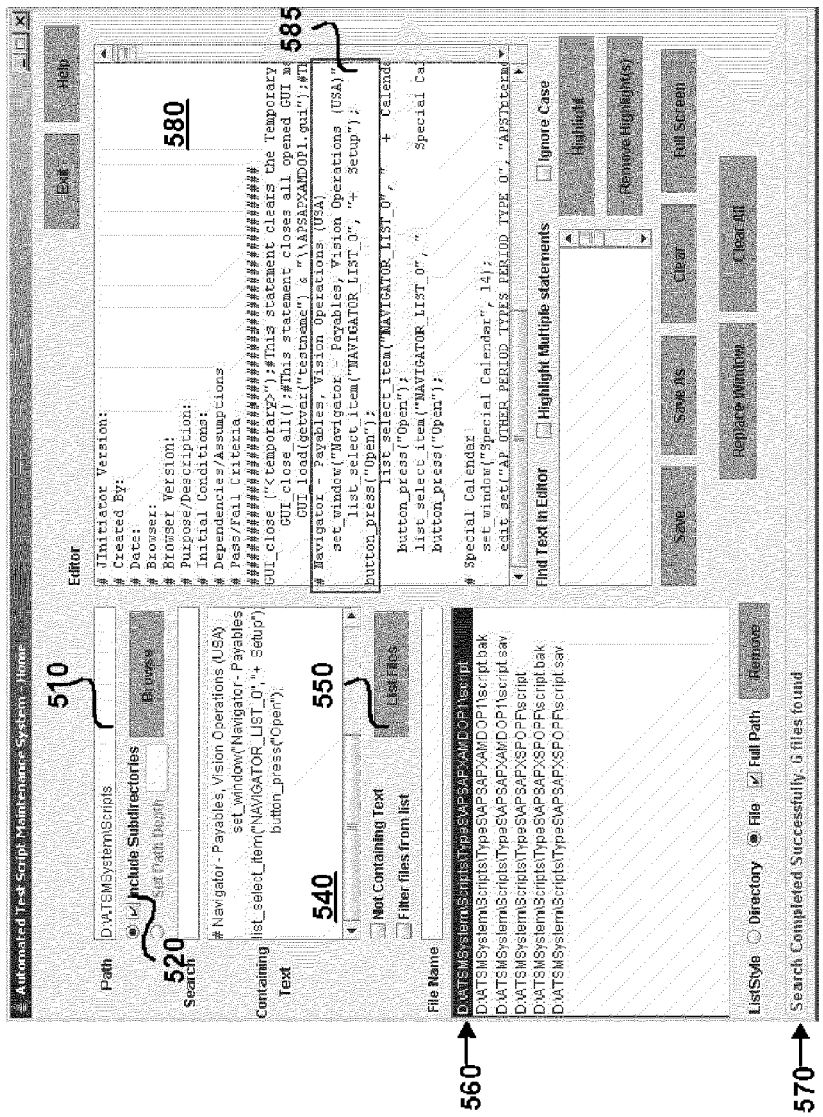
FIG. 5 depicts a user interface to locate files containing a multi-line search string in one embodiment.

FIG. 5 depicts a user interface to locate files containing a multi-line search string in one embodiment. FIG. 5 contains text field 510, include subdirectories checkbox 520, text areas 540 and 580 (containing content 585), list files button 550, file list 560 and status bar 570.

A user specifies directories to be searched by typing a directory path ("D:\ATSMSytem\Scripts") in text field 510. The user then selects include subdirectories checkbox 520 signifying that all the subdirectories of the directory path specified be included in the search in step 420. As such, script maintenance system performs the search for the multi-line string in the content of the files in the specified directory and the subdirectories of the specified directory.

The user then specifies a multi-line search string in text area 540. As may be appreciated, each line of text is displayed on a corresponding physical line of text area 540 (which makes the implementation more user-friendly). Furthermore, when the search is performed for matches, the white spaces at the beginning and end of each line are ignored, thereby avoiding non-matches in case of unintentionally left white spaces in the end and beginning of each line.

On clicking list files button 550, script maintenance system identifies a list of files containing the search string and ignoring the white space characters at the beginning and end of lines (as described in detail above with respect to step 450).

Script maintenance system displays the list of files in file list 560 as per step 480. Status bar 570 depicts the total number ("6") of identified files. The content of a selected file ("D:\ ATSM Sytem\Scripts\TypeS\ APSAPXAMDOP1\ script") is displayed in text area 580. Content 585 depicts the lines corresponding to the search string in the content of the selected/displayed file. It may be observed that the white space characters at the beginning of the lines of content 585 and the search string have been ignored while performing the comparison.

7. Enabling a User to Locate Files Not Containing a Search String

Figure 6:
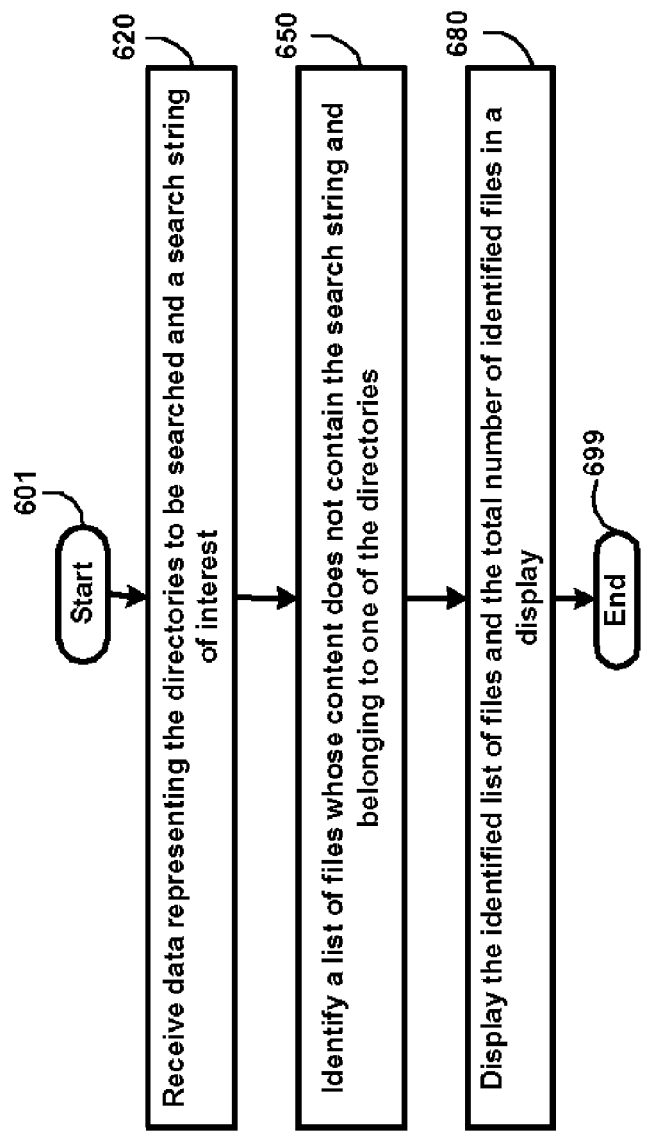
FIG. 6 is a flowchart illustrating the manner in which a user can locate files not containing a search string according to one aspect of the present invention.

FIG. 6 is a flowchart illustrating the manner in which a user can locate files not containing a search string according to an aspect of the present invention. The flowchart is described with respect to the system of FIG. 1 merely for illustration. However, the features can be implemented in various other environments without departing from the scope and spirit of the present invention. The flowchart begins in step 601, in which control passes to step 620.

In step 620, script maintenance system receives data representing the directories to be searched and a search string of interest. The directories to be searched may be specified as described above with relation to step 420. The search string may contain multiple lines of text, which may be specified as described above with respect to FIG. 4.

In step 650, script maintenance system identifies a list of files whose content does not contain the search string and belonging to one of the directories (to be searched). In the scenario where the search string consists of multiple lines of text, various features described above with relation to FIG. 4 may be used to determine the files that do not contain the search string. In general, the identification entails examining the characters present in the content of each file to ensure that the search string is not matched in the entire file, that is, the sequence of characters in the search string is not present in the content of the file.

In step 680, script maintenance system displays the identified list of files and the total number of identified files on a display in an embodiment of the present invention. The identified files (and/or the total number of identified files) may be displayed as per features described above in relation to step 280. The flowchart ends in step 699.

In an embodiment described below, the content of a file selected from the list of identified files is displayed to the user, enabling the user to manually verify that the search string is not contained in the selected file. The features of FIG. 6 are described below with an example user interface.

8. User Interface to Locate Files Not Containing a Search String

Figure 7:
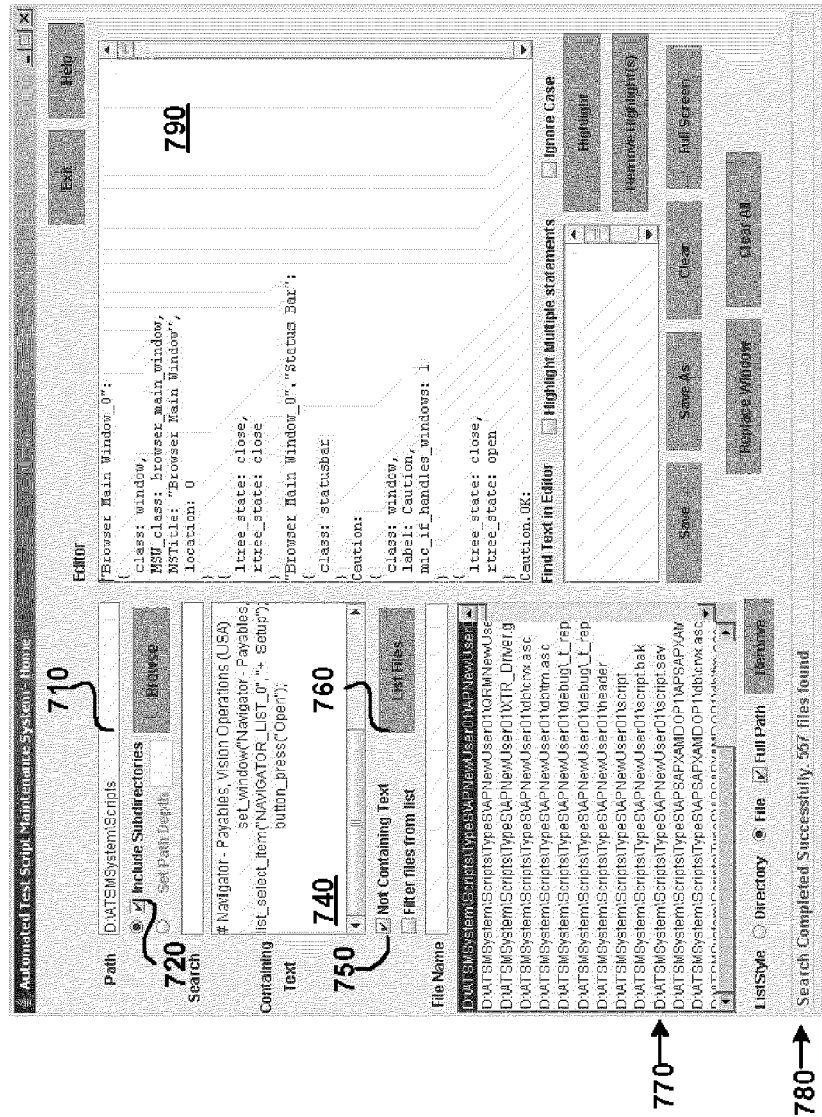
FIG. 7 depicts a user interface to locate files not containing a search string in one embodiment.

FIG. 7 depicts a user interface to locate files not containing a search string in one embodiment. FIG. 7 contains text field 710, include subdirectories checkbox 720, text area 740 and 790, not containing text checkbox 750, list files button 760, file list 770, and status bar 780.

A user specifies directories to be searched by typing a directory path ("D:\ATSMSytem\Scripts") in text field 710 and by selecting include subdirectories checkbox 720 signifying that all the subdirectories of the directory path entered be included in the search in step 620. The user then specifies a search string in text area 740 and selects not containing text checkbox 750 signifying that the search is to be conducted for files whose content does not contain the specified search string.

On clicking list files button 760, script maintenance system identifies a list of files not containing the search string (as described in detail above with respect to step 650). Script maintenance system displays the list of files in file list 770 as per step 680. Status bar 780 depicts the total number ("557") of identified files. The content of a selected file is displayed in text area 790 enabling the user to verify that the selected file does not contain the search string.

9. Enabling a User to Search in only a Displayed List of Files

Figure 8:
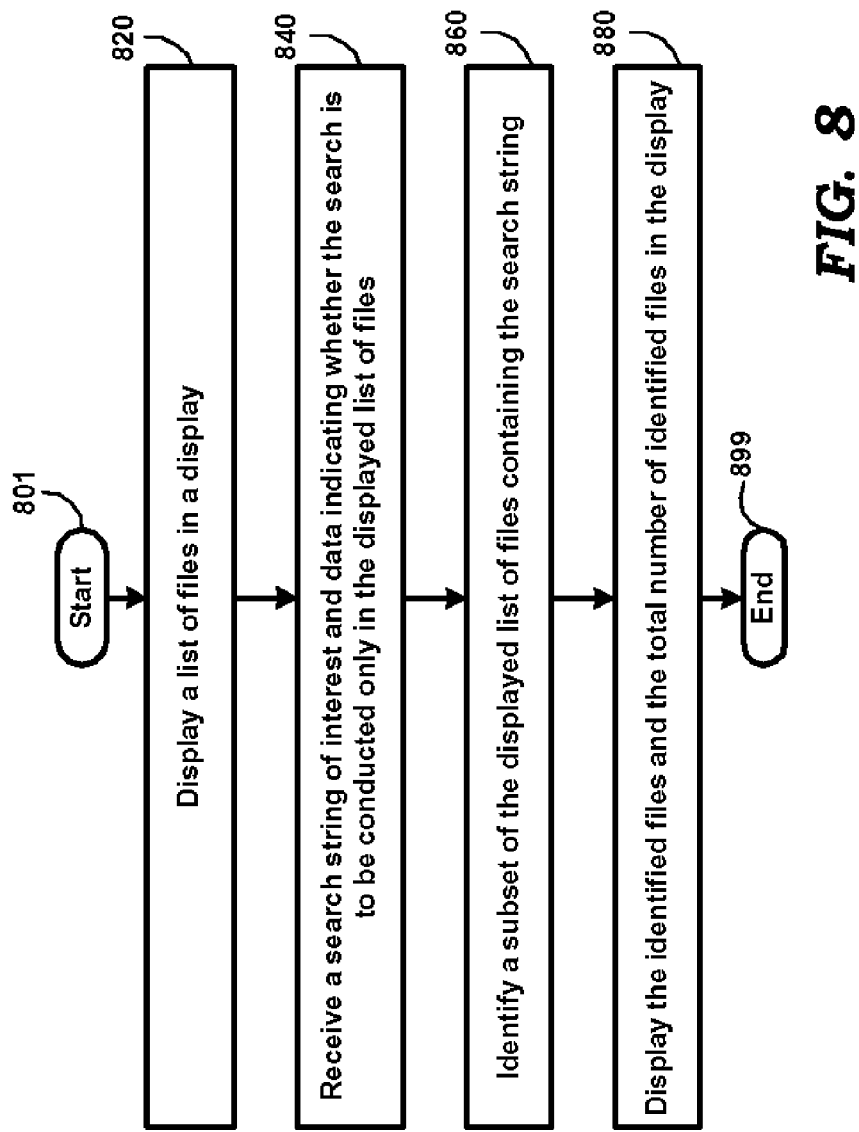
FIG. 8 is a flowchart illustrating the manner in which a user can search for a desired string in only a displayed list of files according to one aspect of the present invention.

FIG. 8 is a flowchart illustrating the manner in which a user can search for a desired string in only a displayed list of files according to an aspect of the present invention. The flowchart is described with respect to the system of FIG. 1 merely for illustration. However, the features can be implemented in various other environments without departing from the scope and spirit of the present invention. The flowchart begins in step 801, in which control passes to step 820.

In step 820, script maintenance system displays a list of files on a display. The files may be displayed as per features described above in relation to step 280.

In step 840, script maintenance system receives a search string of interest and data indicating whether the search is to be conducted only in the displayed list of files. The search string may contain multiple lines of text, which may be specified as described above with respect to FIG. 4.

In step 860, script maintenance system identifies a subset of the displayed list of files containing the search string. It may be appreciated that options may be provided to the user to specify whether the search is to be conducted for files containing or not containing the search string. In the scenario where the search string consists of multiple lines of text, various features described above with relation to FIG. 4 may be used to determine the files that contain the search string.

In step 880, script maintenance system displays the identified list of files and the total number of identified files in the display in an embodiment of the present invention. The identified files (and/or the total number of identified files) may be displayed as per features described above in relation to step 280. The flowchart ends in step 899.

It may be appreciated that the displayed list of files (in step 820) may be the result of conducting a search for files containing/not containing a search string in a set of directories as per features described above in relation to FIG. 4 and FIG. 6 respectively. As such, a user is enabled to conduct multiple searches, each search being conducted in the resultant list of files of the previous search thereby enabling the user to find the files of interest efficiently/accurately. The features of FIG. 8 are described below with an example user interface.

10. User Interface to Search in only a Displayed List of Files

Figure 9:
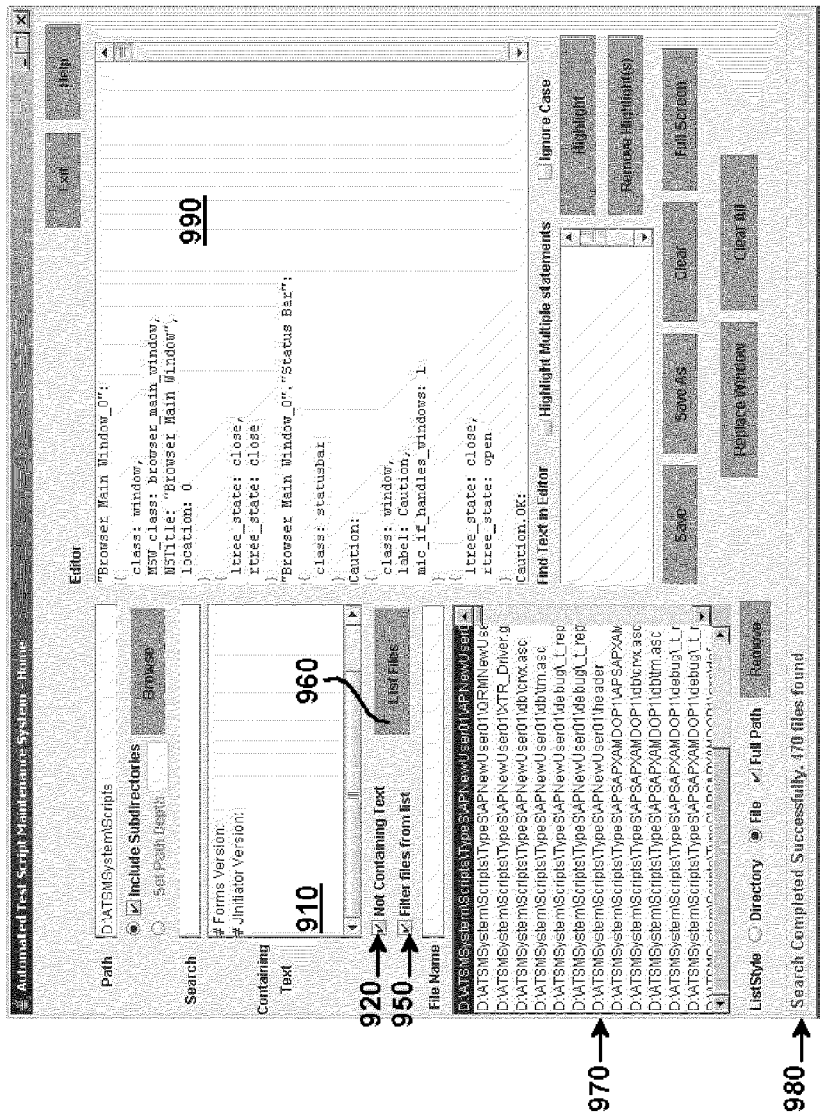
FIG. 9 depicts a user interface to search in only a displayed list of files in one embodiment.

FIG. 9 (in combination with FIG. 7) depicts a user interface to search in only a displayed list of files in one embodiment. FIG. 9 contains text area 910 and 990, not containing text checkbox 920, filter files from list checkbox 950, list files button 960, file list 970 and status bar 980.

Script maintenance system displays a list of files in file list 970 as per step 820. It may be observed that the list of files is the resultant list of files identified in step 680 as per the example scenario described in relation to FIG. 7. A user specifies a search string in text area 910 and selects not containing text checkbox 920 signifying that the search is to be conducted for files whose content does not contain the specified search string as per step 840. The user then selects filter files from list checkbox 950 indicating the search is to be conducted only in the displayed list of files.

On clicking list files button 960, script maintenance system identifies a subset of the list of files not containing the search string (as described in detail above with respect to step 860). Script maintenance system displays the list of identified files in file list 970 as per step 880. Status bar 980 depicts the total number ("470") of identified files. The content of a selected file is displayed in text area 990. It may be observed that the total number ("470") of identified files is less than the total number ("557") of files initially displayed (in area 780).

In an alternative embodiment, another file list (similar to file list 970) is provided to display the identified list of files; enabling the user to view/compare the list of identified files with the displayed list of files. Alternatively, an option may be provided to a user to select whether to view the displayed list of files (of step 820) or the identified list of files (of step 860). For example, the displayed list of files and the identified list of files are displayed under separate tabs in a multi-tabbed interface enabling the user to switch between the lists of files by selecting the corresponding tab.

11. Enabling a User to Select a File from a List of Files

Figure 10:
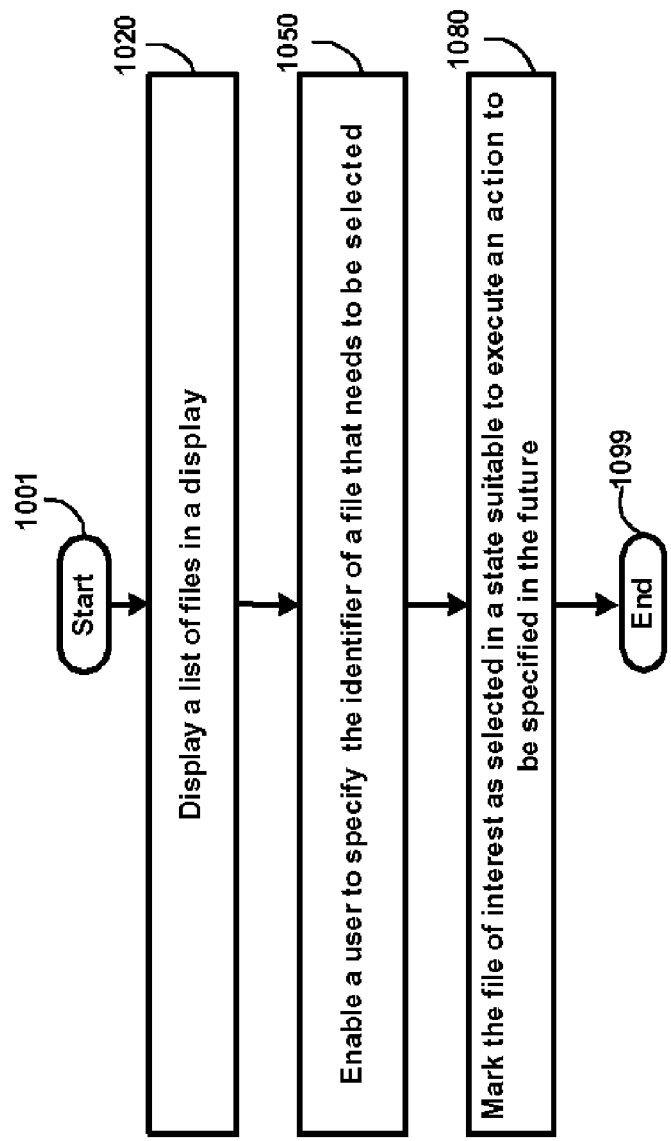
FIG. 10 is a flowchart illustrating the manner in which a user can select a file from a list of files according to one aspect of the present invention.

FIG. 10 is a flowchart illustrating the manner in which a user can select a file from a list of files according to an aspect of the present invention. The flowchart is described with respect to the system of FIG. 1 merely for illustration. However, the features can be implemented in various other environments without departing from the scope and spirit of the present invention. The flowchart begins in step 1001, in which control passes to step 1020.

In step 1020, script maintenance system displays a list of files on a display. The files may be displayed as per features described above in relation to step 280. An identifier is associated with each of the files displayed. For example, a unique number (to be used as an identifier) may be displayed along with the name of each of the files. Alternatively, the name of the file (and/or with the directory to which the file belongs) may be used as the identifier.

In step 1050, script maintenance system enables a user to specify the identifier of a file that needs to be selected. The user specifies the file by entering the identifier in a text field.

In step 1080, script maintenance system marks the file of interest as selected in a state suitable to execute an action to be specified in the future. For example, the user may then press a delete key (or select a delete icon using a mouse) to erase the file or press a enter key to open the file.

If the file does not exist in the displayed file list 1170, script maintenance system may alert the user of the non-existence. On the other hand, if more than one file name matches the entered identifier, the first occurrence in the displayed list may be selected, pressing Enter key will select the next occurrence of the file. The flowchart ends in step 1099.

It may be appreciated that the selection of a file from a list of files by using the identifier of the file enables a user to quickly and/or efficiently locate a file from a large number of files for further action. The features of FIG. 10 are described below with an example user interface.

12. User Interface to Select a File from a List of Files

Figure 11:
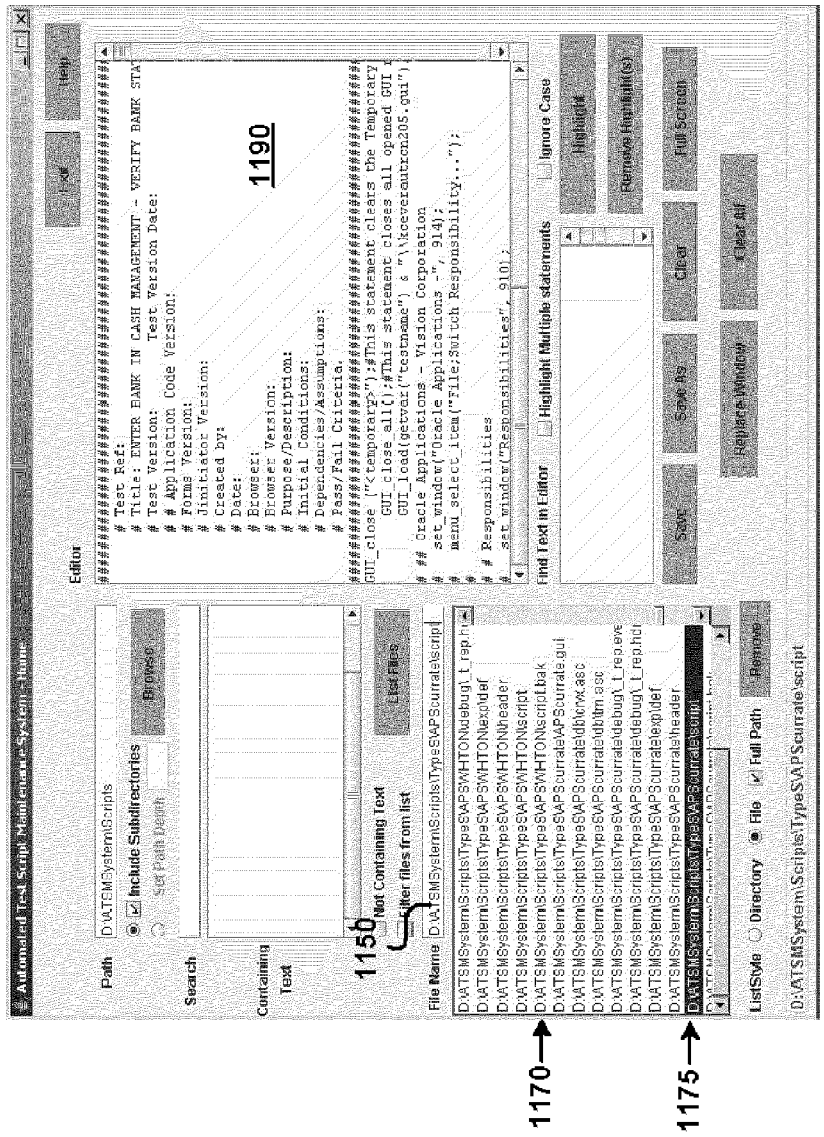
FIG. 11 depicts a user interface to select a file from a list of files in one embodiment.

FIG. 11 depicts a user interface to select a file from a list of files in one embodiment. FIG. 11 contains text field 1150, file list 1170 (containing line 1175) and text area 1190.

Script maintenance system displays a list of files in file list 1170 as per step 1020. A user specifies an identifier ("D:\ATSMSytem\Scripts\TypeS\APScurrate\script") of a file to be selected in the list of files in text field 1150 as per step 1050. The user on pressing the "Enter" key, script maintenance system marks the file of interest (shown in line 1175) as selected as per step 1080. The content of the selected file is displayed in text area 1190.

13. Locating Occurrences of a Search String

Figure 12:
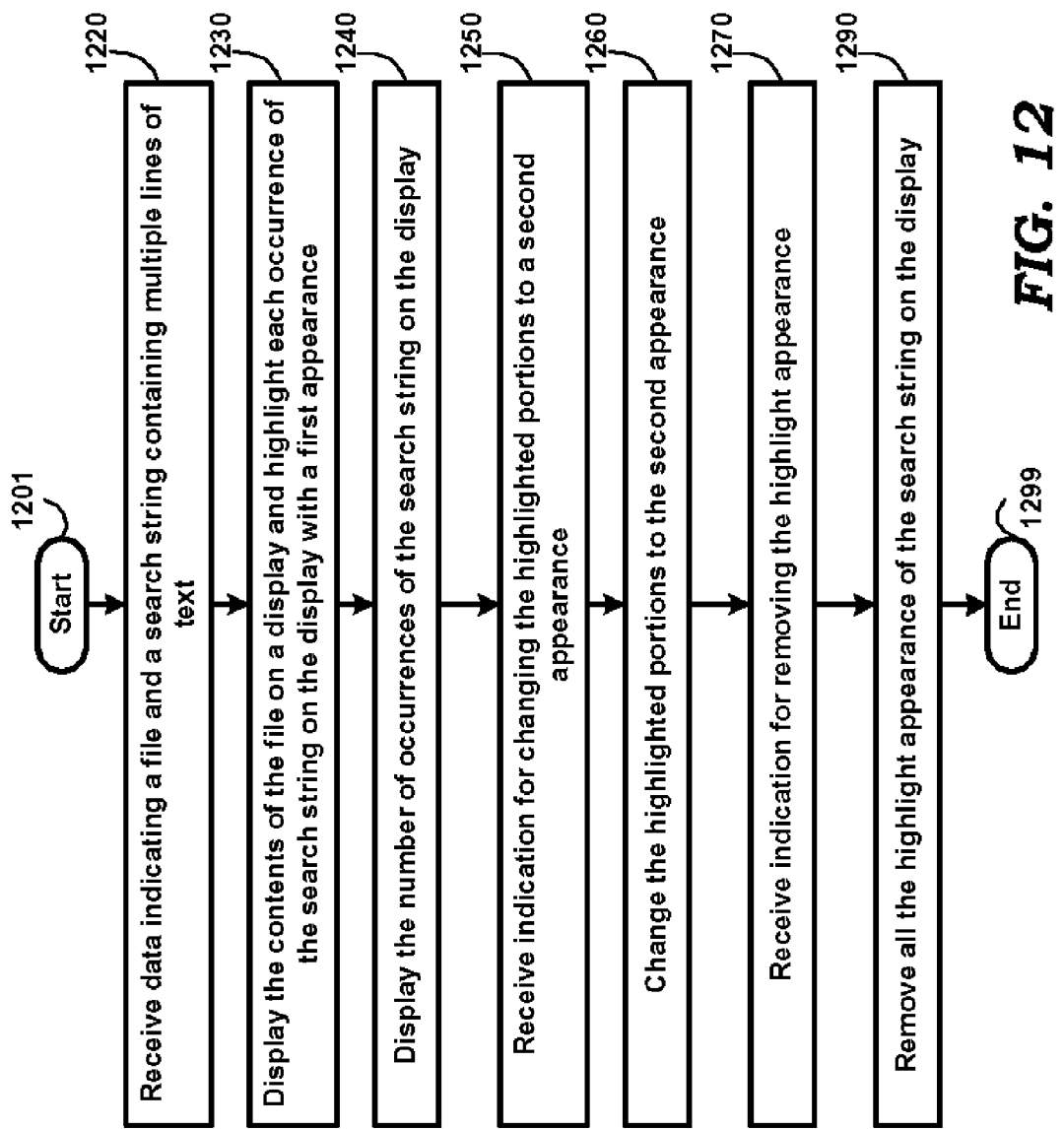
FIG. 12 is a flowchart illustrating locating occurrences of a search string according to an aspect of the present invention.

FIG. 12 is a flowchart illustrating locating occurrences of a search string according to an aspect of the present invention. The flowchart is described with respect to the system of FIGS. 1 and 11 merely for illustration. However, the features can be implemented in various other environments without departing from the scope and spirit of the present invention. The flowchart begins in step 1201, in which control passes to step 1220.

In step 1220, script maintenance system receives data indicating a file and a search string containing multiple lines of text. The file may be specified using the name of the file and/or the path (directory) of the file in text area 1150. Alternatively, a file may be selected from a list of files displayed on a display. The search string may contain multiple lines of text, which may be specified as described above with respect to FIG. 4. The matching portions may be determined by considering leading and trailing white spaces. The corresponding comparisons may be performed in a known manner.

In step 1230, script maintenance system displays the content of the file on a display and highlights each matching occurrence of the search string on the display with a first appearance. In one embodiment, each occurrence is highlighted with a color different from the color of the display. In step 1240, script maintenance system displays the number of occurrences of the search string on the display.

In step 1250, script maintenance system receives indication for changing the highlighted portions to a second appearance. In step 1260, script maintenance system changes the highlighted portions to the second appearance. In one embodiment, the color of the highlighted portions is changed in a random manner. Alternatively, a user may be provided with an option to first select a color of the user's choice and the highlighted portions may be displayed with the selected color upon receiving the indication for changing the appearance.

In step 1270, script maintenance system receives indication for removing the highlight appearance. In step 1290, script maintenance system removes all the highlight appearance of the search string on the display. That is, the matching text is displayed with the same appearance as the rest of the content. The flow chart ends in 1299.

It should be appreciated that the feature of steps {1250, 1260} and the feature of steps {1270 and 1290} can each be implemented in conjunction with smaller search strings in alternative embodiments. That is, the approaches can be applied in the case of single line search strings as well. The features of FIG. 12 are described below with an example user interface.

14. User Interface for Locating Occurrences of a Search String

Figure 13:
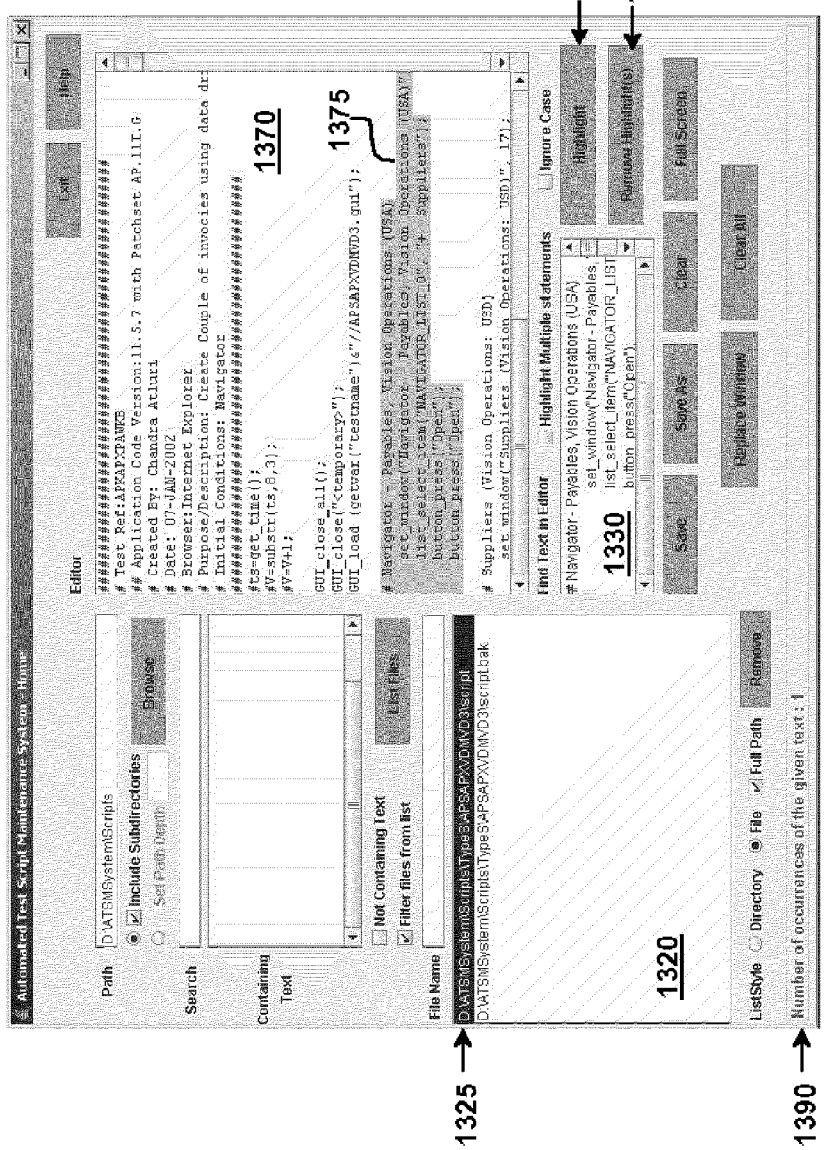
FIG. 13 depicts a user interface for locating occurrences of a search string in one embodiment.

FIG. 13 depicts a user interface for locating occurrences of a search string in one embodiment. FIG. 13 contains file list 1320 (containing line 1325), text area 1330 and 1370 (containing content 1375), highlight button 1350, remove highlights button 1380 and status bar 1390.

A user selects a file (line 1325) from file list 1320 and types a multi-line search string in text area 1330 as per step 1220. On clicking highlight button 1350, script maintenance system displays the contents of the selected file in text area 1370 and highlights each occurrence (for example, content 1375) of the search string in a pre-defined color as per step 1230. The number of occurrences ("1") of the search string is displayed in status bar 1390 as per step 1240.

The user on again clicking highlight button 1350, script maintenance system changes the color of the highlighted portion as per steps 1250 and 1260. The user on clicking remove highlights button 1380, script maintenance system removes all the highlight colors as per steps 1270 and 1290.

15. Enabling a User to Specify a Search String

Figure 14:
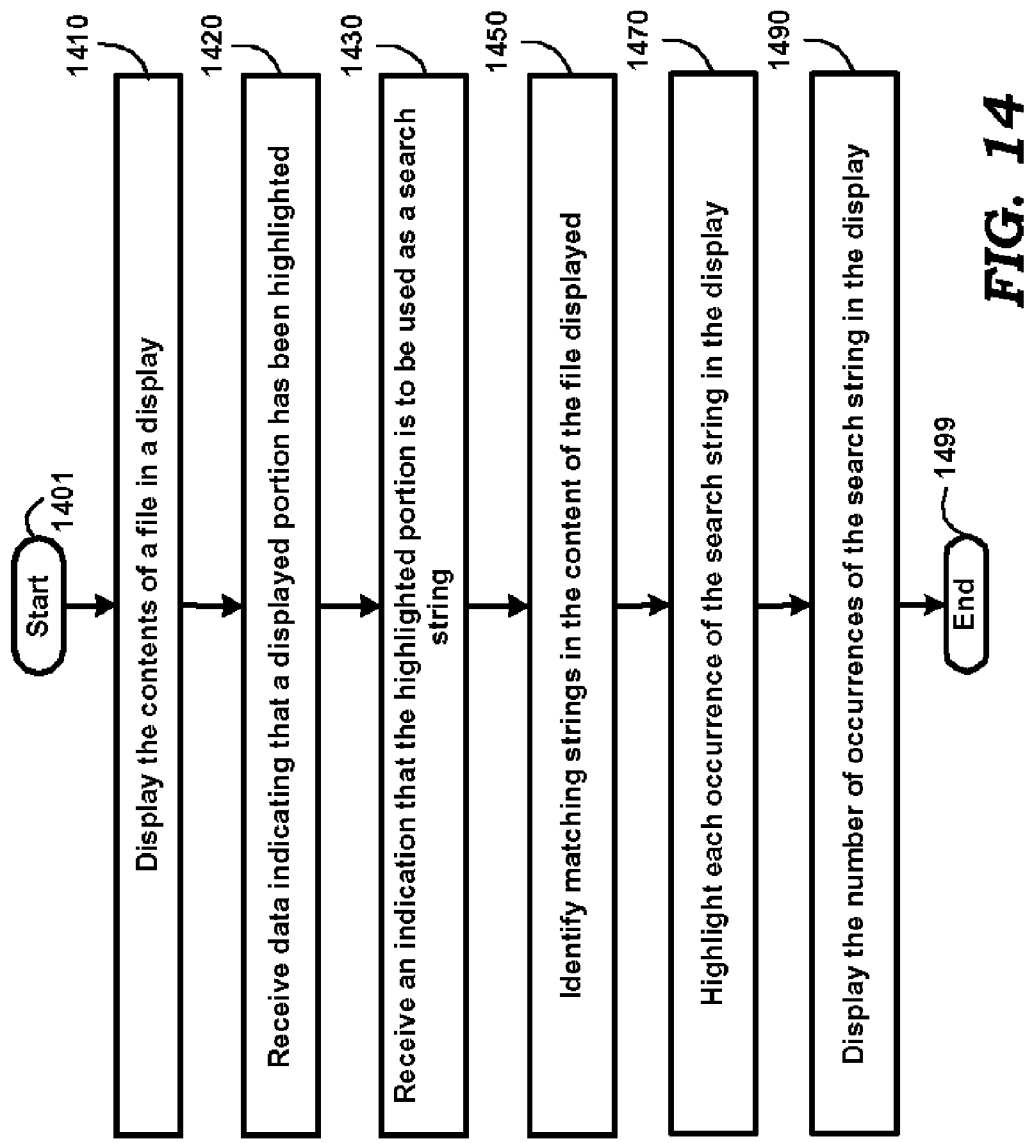
FIG. 14 is a flowchart illustrating the manner in which a user can specify a search string according to an aspect of the present invention.

FIG. 14 is a flowchart illustrating the manner in which a user can specify a search string according to an aspect of the present invention. The flowchart is described with respect to the system of FIG. 1 merely for illustration. However, the features can be implemented in various other environments without departing from the scope and spirit of the present invention. The flowchart begins in step 1401, in which control passes to step 1410.

In step 1410, script maintenance system displays the content of a file in a display. In step 1420, script maintenance system receives data indicating that a displayed portion has been highlighted. The highlighting may be performed using a keyboard or using a mouse and graphical tools provided.

In step 1430, script maintenance system receives an indication that the highlighted portion is to be used as a search string. In the scenario where the search string contains multiple lines of text, the search string may be specified as described above with respect to FIG. 4.

In step 1450, script maintenance system identifies matching strings in the content of the file displayed. In step 1470, script maintenance system highlights each occurrence of the search string in the display. In step 1490, script maintenance system displays the number of occurrences of the search string in the display.

It may be appreciated that features such as changing the appearance of the highlighted portions and the removal of the highlights may be provided as described above in relation to FIG. 12. The features of FIG. 14 are described below with an example user interface.

16. User Interface to Specify a Search String

Figure 15A:
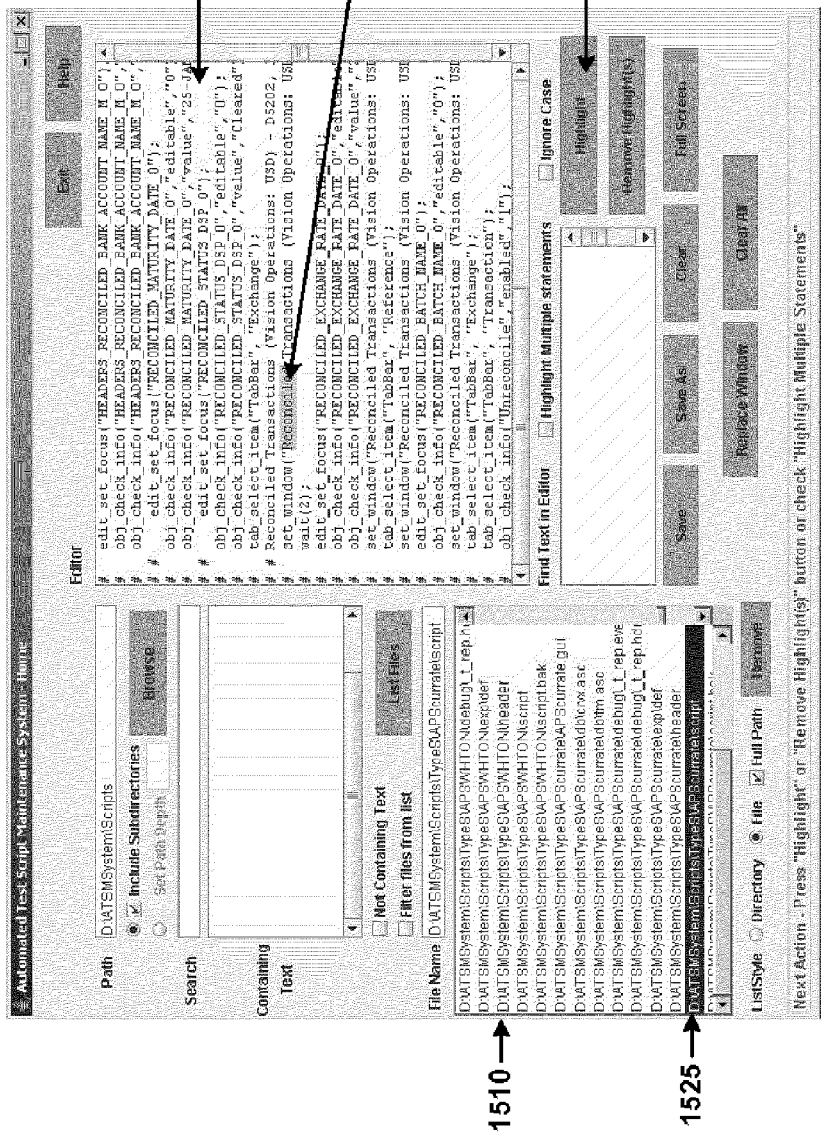
FIG. 15A depicts a user interface to specify a search string in one embodiment.
Figure 15B:
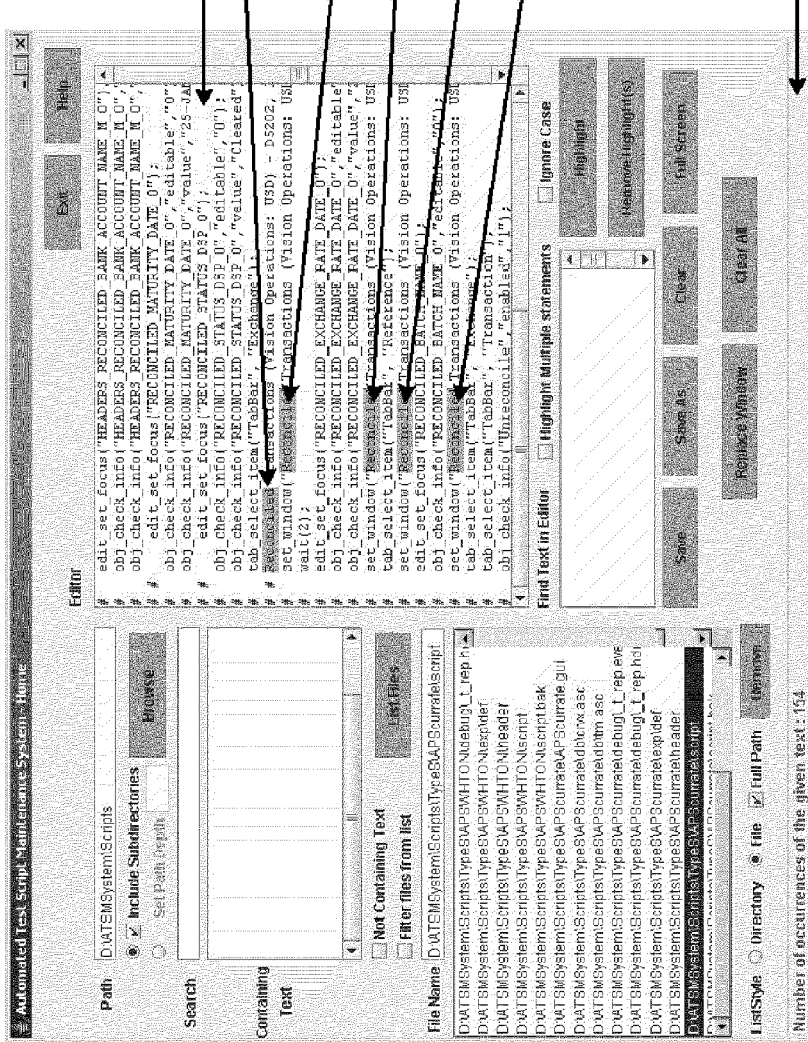
FIG. 15B depicts a user interface displaying the matching strings of search string specified in FIG. 15A.

FIGS. 15A and 15B together illustrate the manner in which a user can specify a search string in one embodiment. Each of the figures is described in detail below.

FIG. 15A depicts a user interface to specify a search string in one embodiment. FIG. 15A contains file list 1510 (containing line 1525), text area 1540 (containing content 1543), highlight button 1560.

A user selects a file (shown in line 1525) from file list 1510 and the content of the selected file is displayed in text area 1540 as per step 1410. The user highlights a displayed portion (content 1543) graphically using a mouse (or a keyboard) in the displayed contents of the file as per step 1420. The user clicks highlight button 1560, indicating that the highlighted portion is to be used as a search string as per step 1430.

FIG. 15B depicts a user interface displaying the matching strings of search string specified in FIG. 15A. FIG. 15B contains text area 1540 (containing contents 1541, 1543, 1545, 1547 and 1549) and status bar 1580.

The user on clicking highlight button 1560, script maintenance system identifies and highlights each occurrence (for example, contents 1541, 1543, 1545, 1547 and 1549) of the search string in text area 1540 as per steps 1450 and 1470. The number of occurrences of the search string ("154") is displayed in status bar 1580 as per step 1490.

17. Enabling a User to Locate Multiple Search Strings

FIG. 16 is a flowchart illustrating the manner in which a user may locate multiple search strings according to an aspect of the present invention. The flowchart is described with respect to the system of FIG. 1 merely for illustration. However, the features can be implemented in various other environments without departing from the scope and spirit of the present invention. The flowchart begins in step 1601, in which control passes to step 1620.

In step 1620, script maintenance system receives data indicating a file and multiple search strings of interest. The search strings can be received according to any convention. In an embodiment described below, the search strings are specified as multiple lines of text, which is specified as described above with respect to FIG. 4.

In step 1650, script maintenance system displays the content of the file on a display and highlights each occurrence of each of the set of search strings on the display. In one embodiment, the set of search strings is highlighted using a set of distinct colors different from the color of the display. Each of the set of search strings is highlighted with a single color from the set of distinct colors.

In step 1680, script maintenance system displays the number of occurrences of each distinct search string from the set of search strings and the total number of occurrences on the display. The flow chart ends in 1699.

It may be appreciated that features such as changing the appearance of the highlighted portions and the removal of the highlights as described above in relation to FIG. 12, may also be provided in combination with the features of FIG. 16 described above. The features of FIG. 16 are described below with an example user interface.

18. User Interface to Locate Multiple Search Strings

Figure 17A:
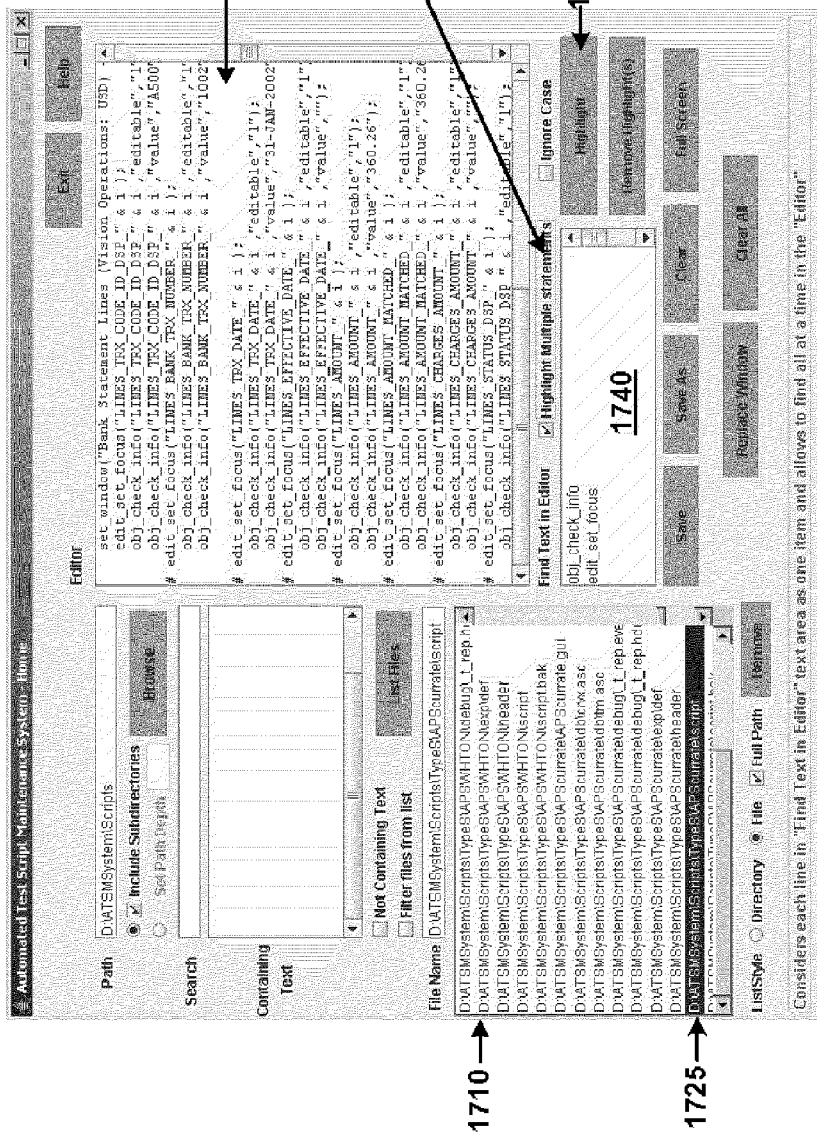
FIG. 17A depicts a user interface to specify multiple search strings in one embodiment.
Figure 17B:
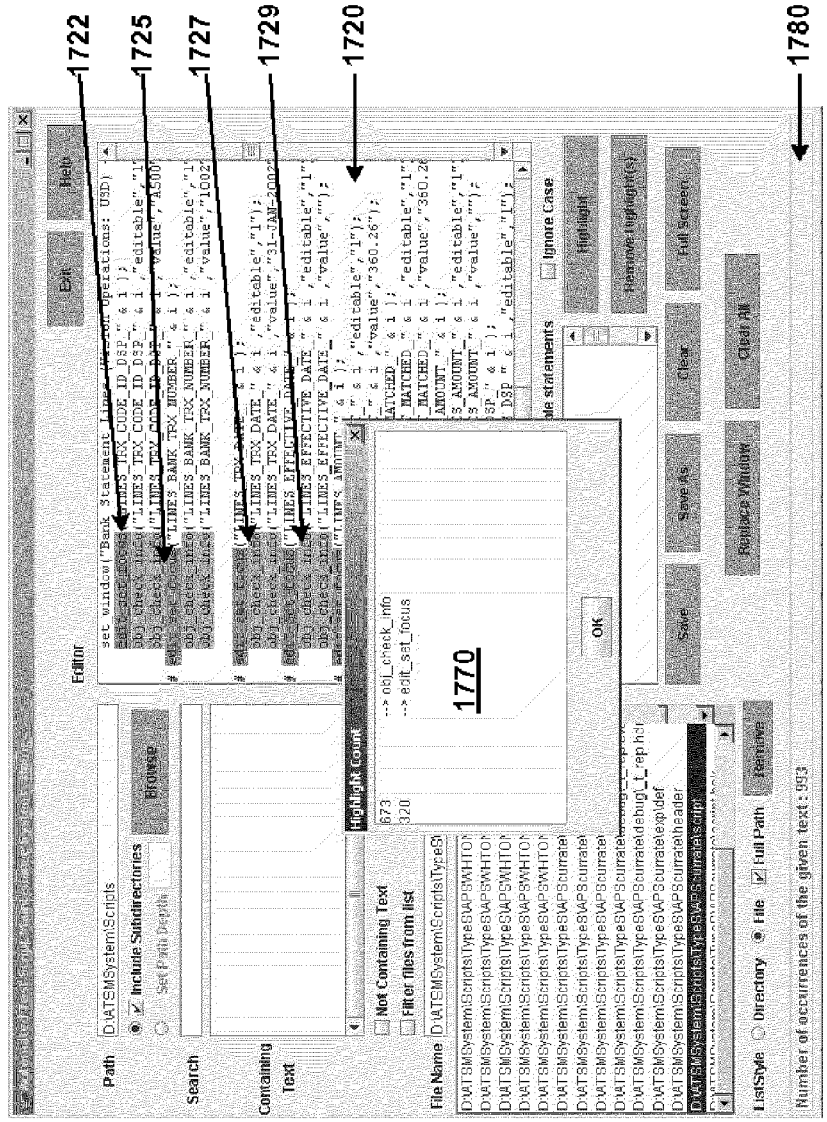
FIG. 17B depicts a user interface displaying the matched strings for the multiple search strings specified in FIG. 17A.

FIGS. 17A and 17B together illustrate the manner in which a user can locate multiple search string in one embodiment. Each of the figures is described in detail below.

FIG. 17A depicts a user interface to specify multiple search strings in one embodiment. FIG. 17A contains file list 1710 (containing line 1725), text area 1720 and 1740, highlight multiple statements checkbox 1750, and highlight button 1760.

A user selects a file (line 1725) from file list 1710 and types a multi-line text in text area 1740 as per step 1620. The user selects highlight multiple statements checkbox 1750 indicating that each line ("obj_check_info" and "edit_set_focus") of the multi-line text is to be considered as a separate search string and clicks highlight button 1760. Script maintenance system receives the multi-line text from the user and separates them into multiple search strings, with each line of text specifying individual search strings.

FIG. 17B depicts a user interface displaying the matched strings for the multiple search strings specified in FIG. 17A. FIG. 17B contains text area 1720 (containing contents 1722, 1725, 1727 and 1729), highlight count 1770 and status bar 1780.

The user on clicking highlight button 1760, script maintenance system highlights each occurrence (for example, contents 1722, 1725, 1727 and 1729) of each of the set of search strings ("obj_check_info" and "edit_set_focus") in a set of distinct colors as per step 1650. The number of occurrences ("673" and "320") of each of the set of search strings is displayed in highlight count 1770 and the total number of occurrences ("993") is displayed in status bar 1780 as per step 1680.

19. Enabling a User to Substitute a Multi-line String

Figure 18:
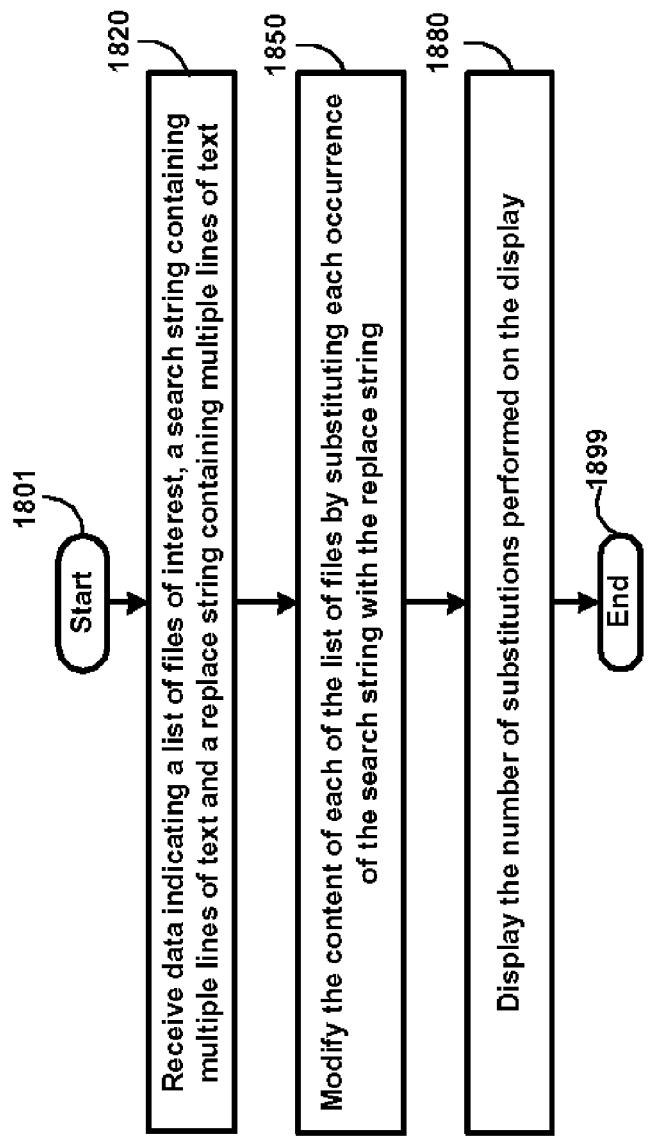
FIG. 18 is a flowchart illustrating the manner in which a user can substitute a multi-line search string with a multi-line replacement string according to an aspect of the present invention.

FIG. 18 is a flowchart illustrating the manner in which a user can substitute a multi-line search string with a multi-line replacement string according to an aspect of the present invention. The flowchart is described with respect to the system of FIG. 1 merely for illustration. However, the features can be implemented in various other environments without departing from the scope and spirit of the present invention. The flowchart begins in step 1801, in which control passes to step 1820.

In step 1820, script maintenance system receives data indicating a list of files of interest, a search string containing multiple lines of text and a replace string containing multiple lines of text. The list of files may be selected (in a contiguous or dis-contiguous manner) from a displayed list of files and tools may be provided to enable a user to select multiple files (for example, all the displayed list of files) in a convenient manner. The multiple lines in the search string and the replacement string may be specified as described above with respect to FIG. 4.

In step 1850, script maintenance system modifies the content of each of the list of files by substituting each occurrence of the search string with the replace string. In step 1880, script maintenance system displays the number of substitutions performed on the display. The flow chart ends in step 1899. The features of FIG. 18 are described below with an example user interface

20. User interface to Substitute a Multi-line String

Figure 19A:
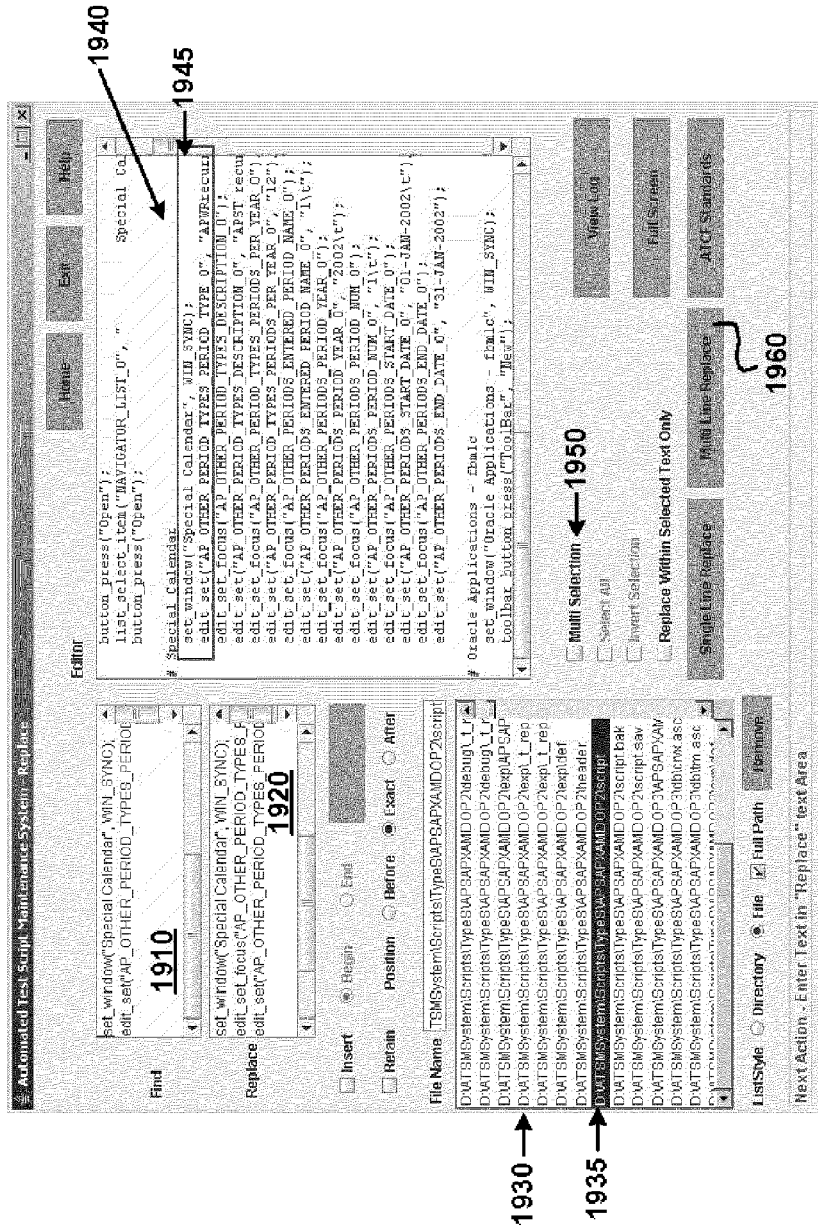
FIG. 19A depicts a user interface to specify a list of files, a multi-line search string, and a multi-line replacement string in one embodiment.
Figure 19B:
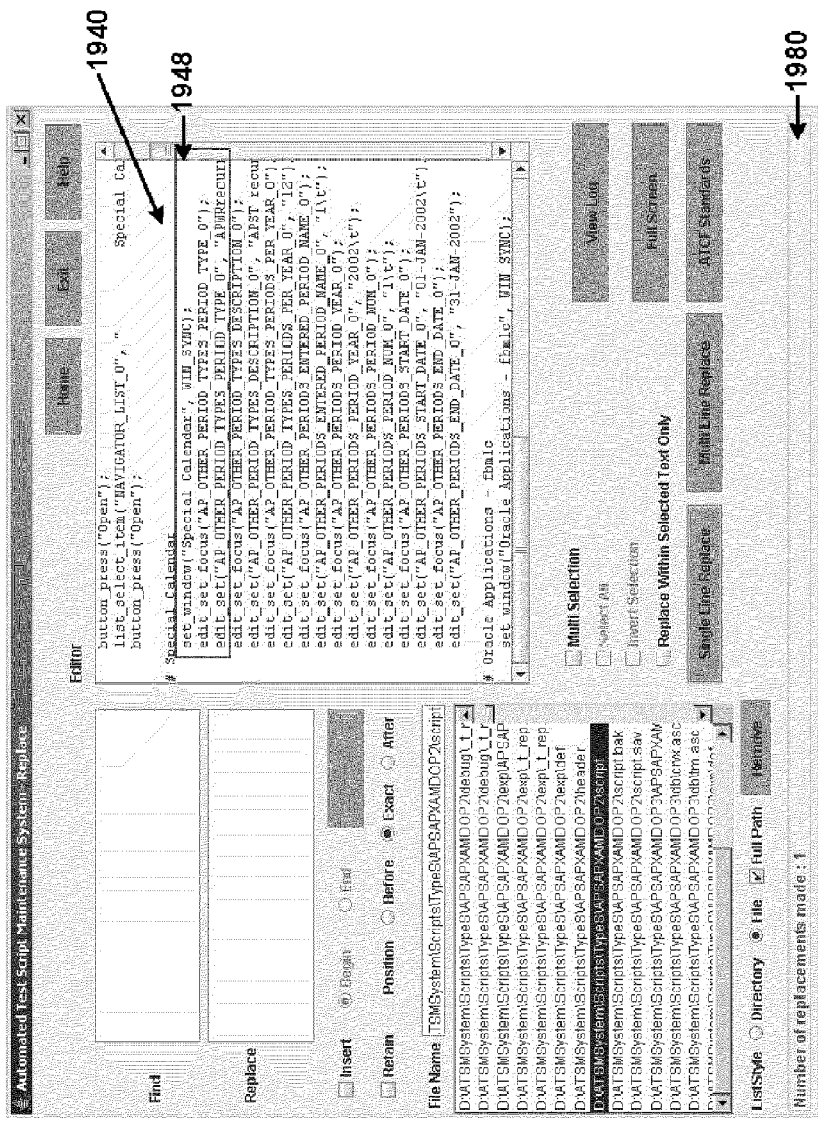
FIG. 19B depicts the result of substituting a multi-line search string with a multi-line replacement string specified in FIG. 19A.

FIGS. 19A and 19B together illustrate the manner in which a user can substitute a multi-line search string with a multi-line replacement string in one embodiment. Each of the figures is described in detail below.

FIG. 19A depicts a user interface to specify a list of files, a multi-line search string, and a multi-line replace string in one embodiment. FIG. 19A contains text area 1910, 1920 and 1940 (containing content 1945), file list 1930 (containing line 1935), multi selection checkbox 1950, and multi-line replace button 1960.

A user types a search string containing multiple lines of text in text area 1910 and a replace string containing multiple lines of text in text area 1920 as per step 1820. The user selects a file (line 1935) from file list 1930 and the content of the selected file is displayed in text area 1940. Content 1945 depicts an occurrence of the search string in the content of the selected file. The user by selecting multi selection checkbox 1950 has an option to select multiple files in file list 1930. The user clicks multi-line replace button 1960 to cause the desired replacements in all the selected files (in this case a single file of line 1935).

FIG. 19B depicts the result of substituting a multi-line search string with a multi-line replacement string specified in FIG. 19A. FIG. 19B contains text area 1940 (containing content 1948) and status bar 1980.

The user on clicking multi-line replace button 1960, script maintenance system substitutes each occurrence of the search string with the replace string as per step 1850. Content 1948 depict the substituted content corresponding to content 1945 where the search string occurring in content 1945 has been substituted with the replace string. The number of substitutions ("1") is displayed in status bar 1980 as per step 1880.

Figure 20:
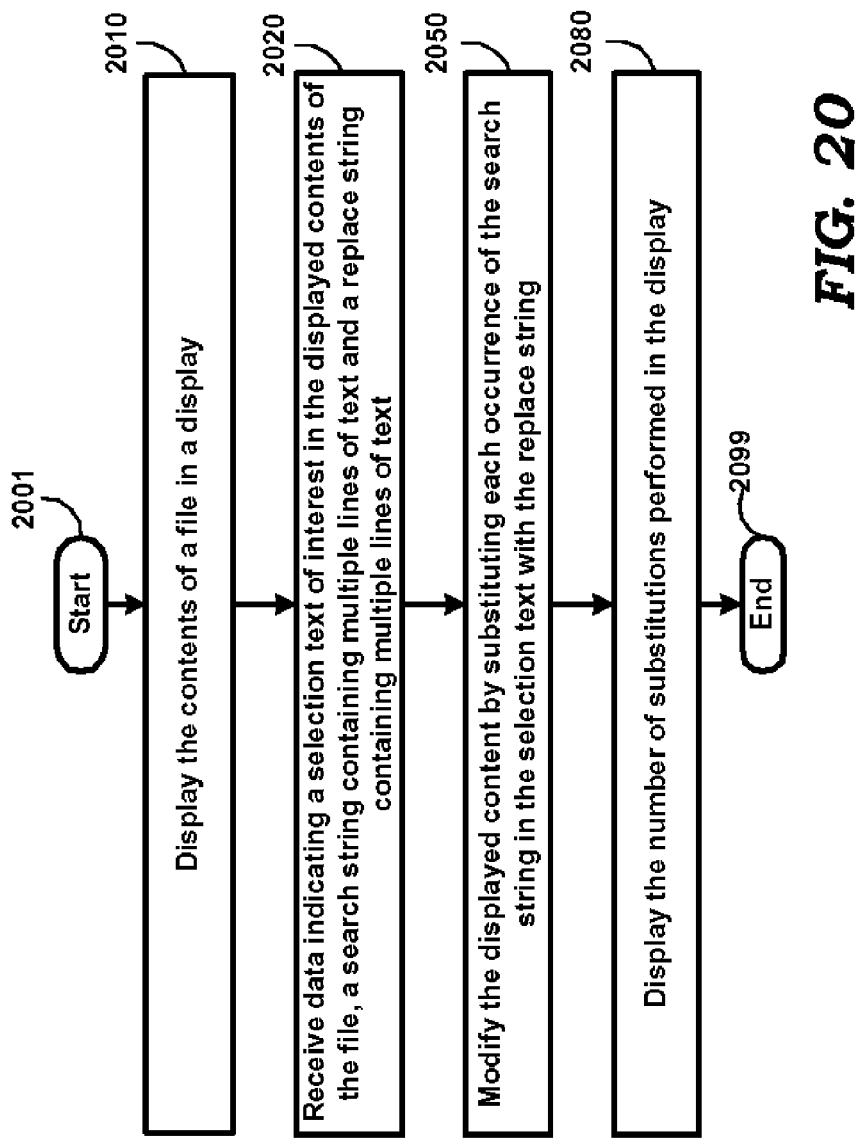
FIG. 20 is a flowchart illustrating the manner in which a user can substitute a multi-line search string with a multi-line replacement string in a selection of text according to an aspect of the present invention.

21. Enabling a User to Substitute a Multi-line String in a Selection of Text FIG. 20 is a flowchart illustrating the manner in which a user can substitute a multi-line search string with a multi-line replacement string in a selection of text according to an aspect of the present invention. The flowchart is described with respect to the system of FIG. 1 merely for illustration. However, the features can be implemented in various other environments without departing from the scope and spirit of the present invention. The flowchart begins in step 2001, in which control passes to step 2010.

In step 2010, script maintenance system displays the contents of a file on a display. In step 2020, script maintenance system receives data indicating a portion of the displayed text selected ("selection text") by a user, a search string containing multiple lines of text and a replace string containing multiple lines of text. The multiple lines in the search string and the replace string may be specified as described above with respect to FIG. 4. Also, a user may select a portion of interest using an appropriate user interface (e.g., GUI) provided by script maintenance system.

In step 2050, script maintenance system modifies the displayed content by substituting each occurrence of the search string in the selection text with the replace string. In step 2080, script maintenance system displays the number of substitutions performed on the display. The flow chart ends in step 2099.

It may be appreciated the displayed contents may be saved to secondary storage, thereby enabling a user to selectively change the content of a file (without affecting the complete contents of the file). The features of FIG. 20 are described below with an example user interface.

22. User Interface to Substitute a Multi-line String in a Selection of Text

Figure 21A:
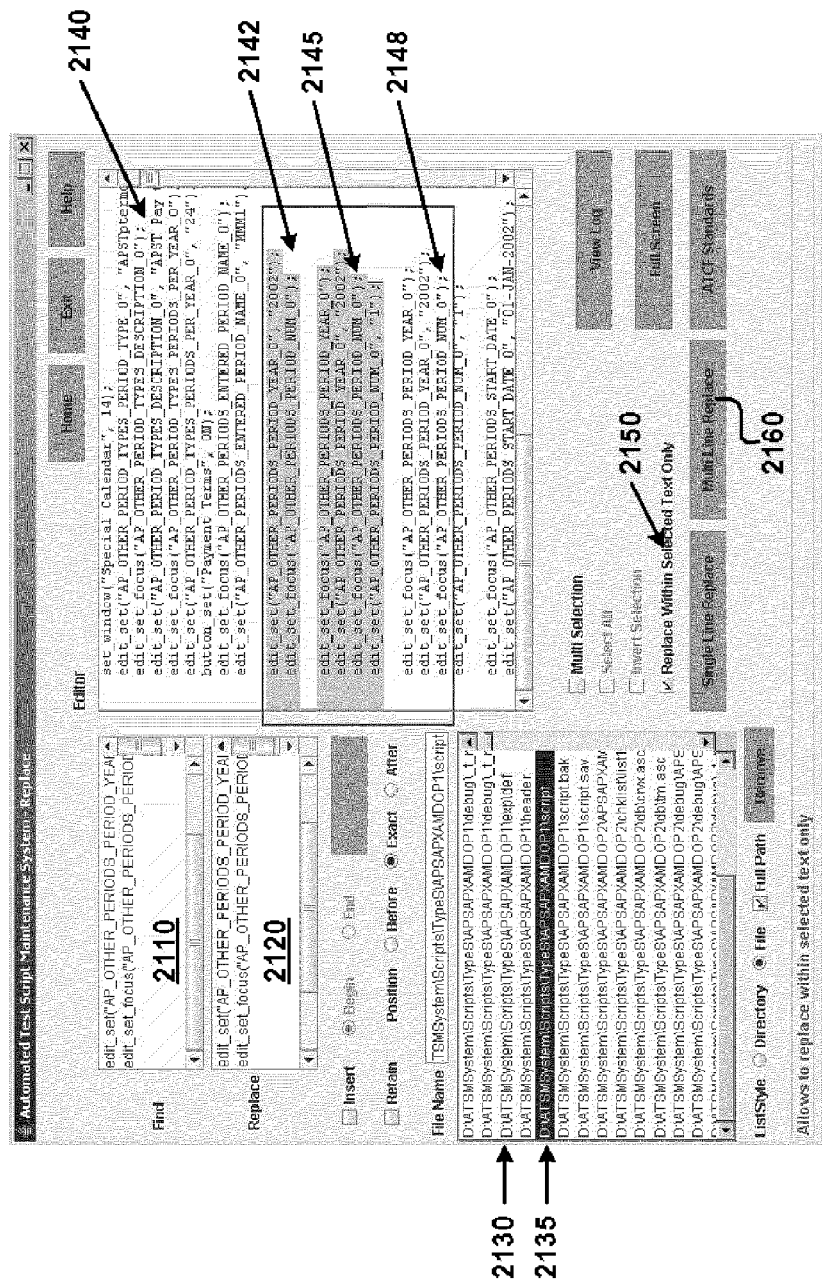
FIG. 21A depicts a user interface to specify a selection of text, a multi-line search string and a multi-line replacement string in one embodiment.
Figure 21B:
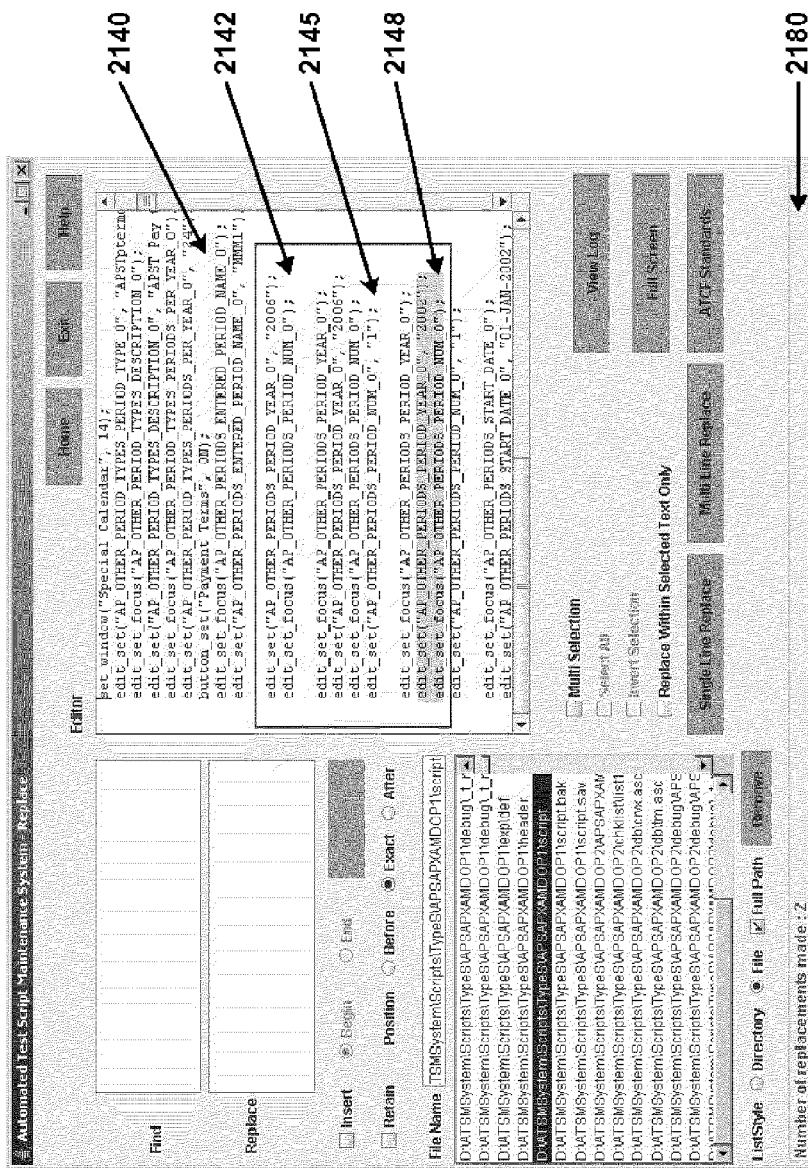
FIG. 21B depicts the results corresponding to the substitutions requested in FIG. 21A.

FIGS. 21A and 21B together illustrate the manner in which a user can substitute a multi-line search string with a multi-line replacement string in a selection of text in one embodiment. Each of the figures is described in detail below.

FIG. 21A depicts a user interface to specify a selection of text, a multi-line search string and a multi-line replacement string in one embodiment. FIG. 21A contains text area 2110, 2120 and 2140 (containing content 2142, 2145 and 2148), file list 2130 (containing line 2135), selected text checkbox 2150, and multi-line replace button 2160.

A user selects a file (line 2135) from file list 2130 and script maintenance system displays the content of the selected file in text area 2140 as per step 2010. The user specifies multi-line search string in text area 2110 and multi-line replace string in text area 2120 respectively. The user checks selected text checkbox 2150 indicating that the substitutions of the search string with the replace string must be performed in the selected text only. The user then selects text using graphical tools (e.g., a combination of mouse and keyboard) provided. Contents 2142 and 2145 depict occurrences of the search string within the selected text. Content 2148 depict an occurrence of the search string in the displayed contents, which has not been selected by the user. The user then clicks on multi-line replace button 2160.

The user on clicking multi-line replace button 2160, script maintenance system substitutes each occurrence of the search string with the replace string in the selected text as per step 2050. FIG. 21B depicts the results corresponding to the substitutions requested in FIG. 21A. FIG. 21B contains text area 2140 (containing content 2142, 2145 and 2148) and status bar 2180.

The search string occurring in content 2142 and 2145 has been substituted with the replace string. The search string occurring in content 2148 has not been substituted since content 2148 were not part of the selection text. The number of substitutions ("2") is displayed in status bar 2180 as per step 2080.

23. Enable a User to Specify Multiple Search Strings

Figure 22:
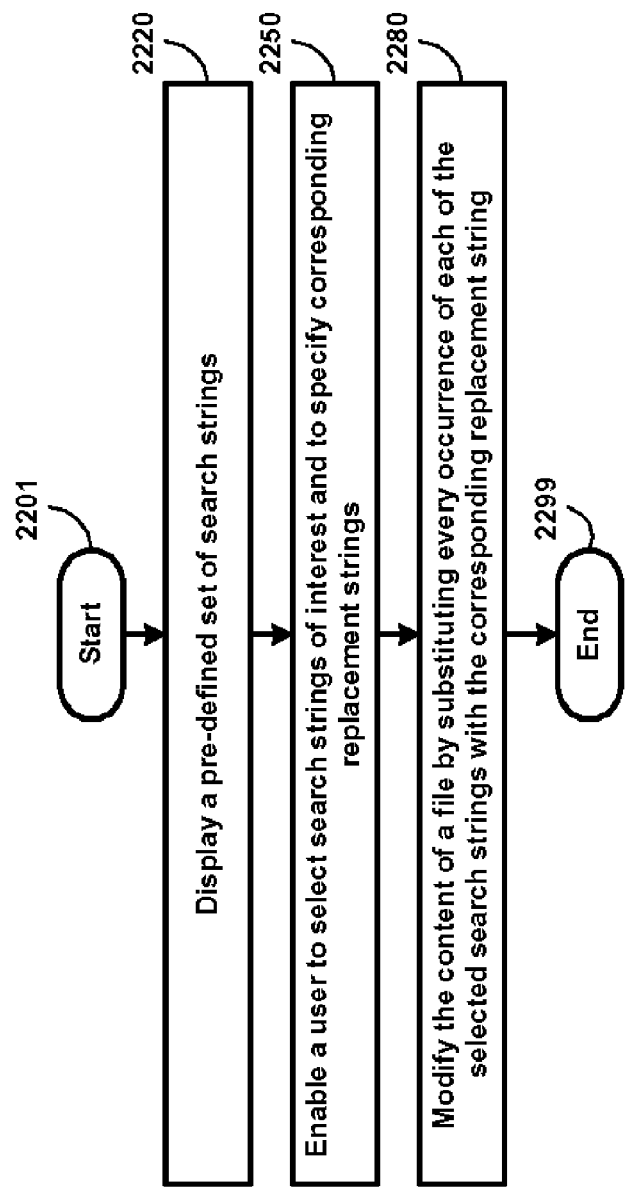
FIG. 22 is a flowchart illustrating the manner in which a user can specify multiple search strings according to an aspect of the present invention.

FIG. 22 is a flowchart illustrating the manner in which a user can specify multiple search strings according to an aspect of the present invention. The flowchart is described with respect to the system of FIG. 1 merely for illustration. However, the features can be implemented in various other environments without departing from the scope and spirit of the present invention. The flowchart begins in step 2201, in which control passes to step 2220.

In step 2220, script maintenance system displays a pre-defined set of search strings in a display.

In step 2250, script maintenance system enables a user to select search strings of interest and to specify corresponding replacement strings. The process of selection may be performed in different ways. For example, each search string may be displayed along with a checkbox in the display and the selection of a checkbox may indicate the selection of the corresponding search string. Alternatively, the search strings may be displayed in the form of a selected list and an unselected list and tools may be provided to move a search string (or multiple search strings) from one list to the other.

Similarly, different interfaces may be provided for specifying the replacement strings. For example, each of the search strings may be displayed along with a text field for specifying a corresponding replacement string. In some scenarios (for example in a testing environment), the set of replacement strings may be pre-defined. That is, each of the pre-defined search strings has a corresponding pre-defined replacement string, enabling the user to quickly/efficiently select the search strings and the corresponding replacement strings.

In step 2280, script maintenance system modifies the content of a file by substituting every occurrence of each of the selected search strings in the content with the corresponding replacement string. The file may be identified by specifying a name and/or path of the file. Alternatively, multiple files may be specified (as explained in detail above in relation to FIG. 18) and the substitutions may be performed in the content of each of the files specified. The flowchart ends in step 2299.

Various other features can be implemented in combination with the search feature described above. One such feature is the linking or association of the pre-defined search strings with a type of a file. The type of a file may be determined by inspecting the extension of the file. As such, depending on the selection of files, the pre-determined search strings (and/or pre-determined replacement strings) associated with the type of files selected may be displayed. A user may be provided a convenient interface to create/modify search strings associated with a type of a file.

A common scenario where such a feature would be required is a testing environment, where test scripts have to be standardized. The standardization process requires the substitution of a set of pre-defined strings with a set of pre-defined standard strings. As number of scripts is large, a convenient user interface is required by which the standardization process can be performed. The features of FIG. 22 are described below with an example user interface.

24. User Interface to Specify Multiple Search Strings

Figure 23:
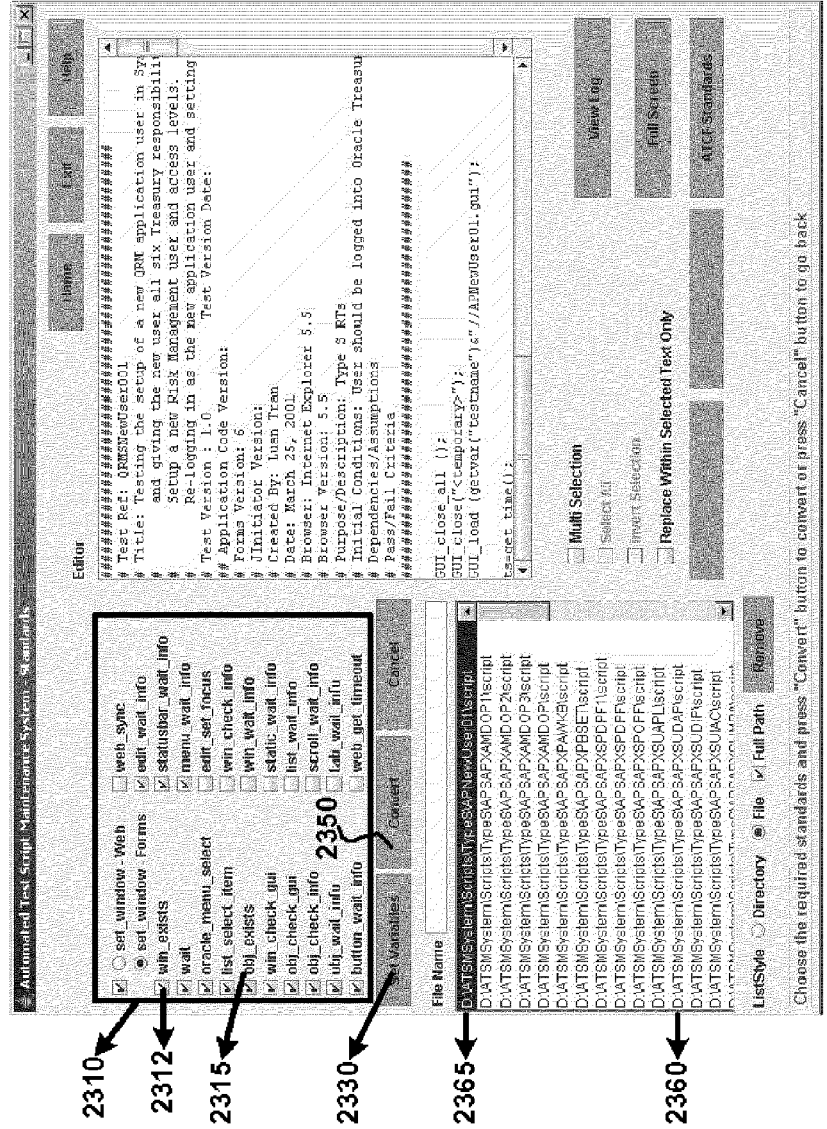
FIG. 23 depicts a user interface to specify multiple search strings in one embodiment.

FIG. 23 depicts a user interface to specify multiple search strings in one embodiment. FIG. 23 contains display list 2310 (containing search string 2312 and 2315), set variables button 2330, convert button 2350 and file list 2360 (with line 2365).

Script maintenance system displays a pre-defined set of strings in display list 2310 as step 2220. Each search string is displayed with a corresponding checkbox, the selection of which indicates the selection of the search string.

A user selects search strings of interest as per step 2250. Search string 2312 and 2315 are two search strings, which have been selected by the user. The user can click on set variables button 2330 taking the user to the set variable interface and enabling the user to specify the replacement strings corresponding to the search strings selected as per step 2250. The detail of the set variable interface is described below in relation to FIG. 24.

The user selects the file (for example, line 2365) in which the substitutions are to be performed in file list 2360. Multiple files may also be specified in the same interface. The user clicks on convert button 2350 and script maintenance system modifies the content of the file(s) selected by substituting each occurrence of each of the search strings selected with the corresponding replacement strings.

Figure 24:
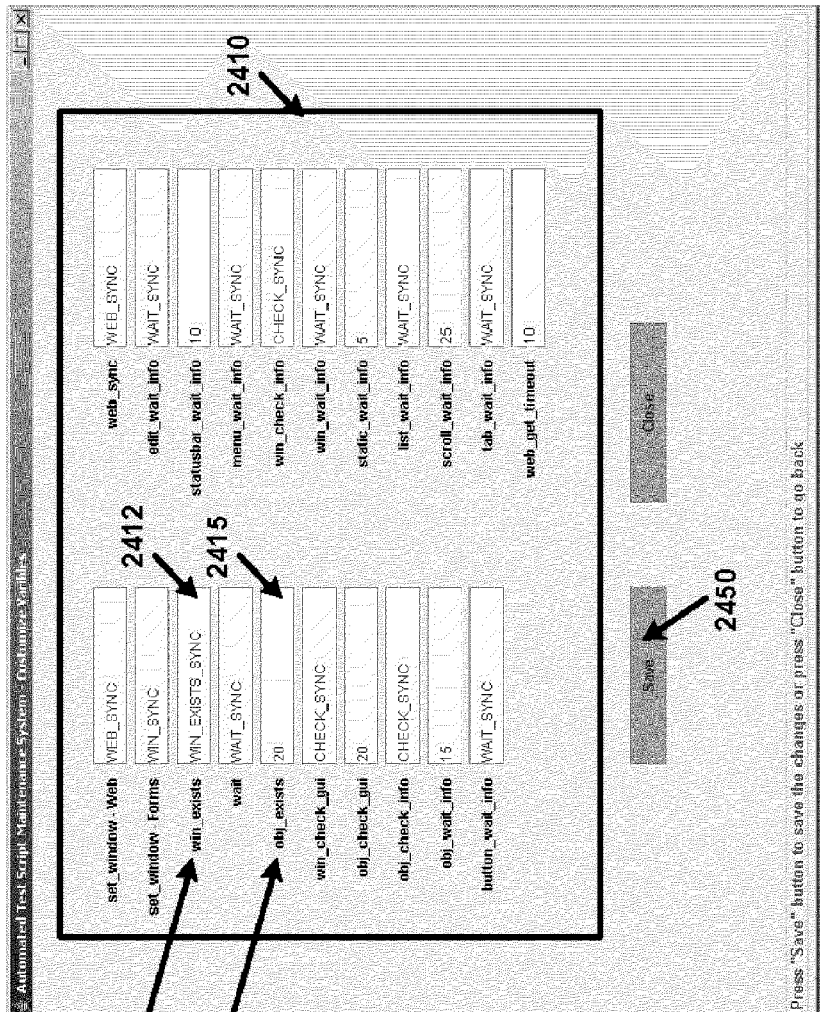
FIG. 24 depicts a user interface to specify replacement strings for the multiple search strings of FIG. 23.

FIG. 24 depicts a user interface to specify replacement strings for the multiple search strings of FIG. 23. FIG. 24 contains display list 2410 (containing search string 2312, 2315 and replacement string 2412, 2415) and save button 2450.

The user on clicking set variables button 2330, script maintenance system displays the pre-defined set of search strings in display list 2410. Each of the search strings (for example, search string 2312 and 2315) is associated with a text field displaying the corresponding replacement string (for example, replacement string 2412 and 2415 corresponding to search string 2312 and 2315 respectively). The user modifies the replacement string and saves the final value (for substitution) by clicking on save button 2450.

25. Enabling a User to Remove Desired Files from a Display

Figure 25:
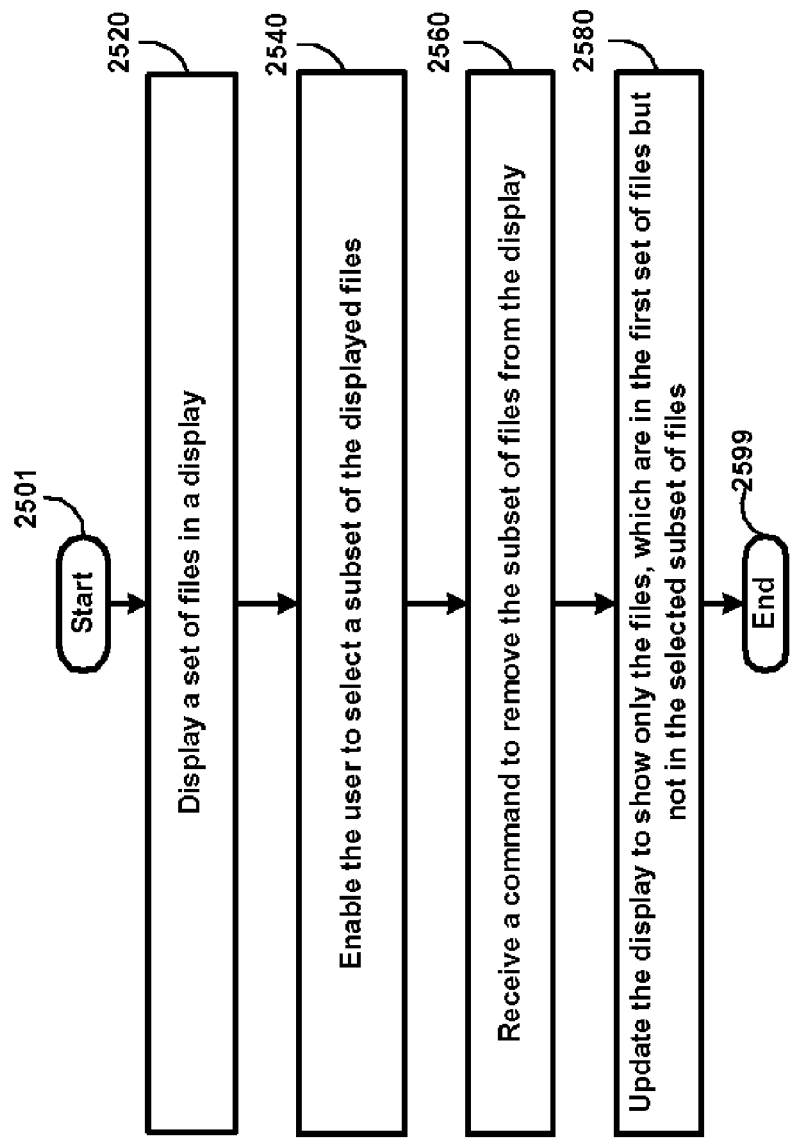
FIG. 25 is a flowchart illustrating the manner in which a user can remove a desired set of files from a displayed list of files according to an aspect of the present invention.

FIG. 25 is a flowchart illustrating the manner in which a user can remove a desired set of files from a displayed list of files according to an aspect of the present invention. The flowchart is described with respect to the system of FIG. 1 merely for illustration. However, the features can be implemented in various other environments without departing from the scope and spirit of the present invention. The flowchart begins in step 2501, in which control passes to step 2520.

In step 2520, script maintenance system displays a first set of files on a display. The first set of files may have been displayed in response to any user operations such as displaying files in a directory, addition of various files of interest as described above, searching files matching a desired criteria, etc. The files may be displayed as described above with respect to FIG. 4.

In step 2540, script maintenance system enables a user to select a subset of the displayed files. The subset of files can be contiguous or dis-contiguous, and may be selected using the approaches described with respect to FIG. 18 also (in addition to, for example, keyboard/mouse combination). In step 2560, script maintenance system receives a command to remove the subset of files from the display.

In step 2580, script maintenance system updates the display to show only the files, which are in the first set of files but not in the selected subset of files. That is, the user may select any desired subset of files to be removed from the display and step 2580 operates to remove the files only from the display, without physically deleting the files from the secondary storage as is often observed in various prior embodiments. The flowchart ends in step 2599. The features of FIG. 25 are described below with an example user interface.

26. User Interface to Remove Desired File from a Display

Figure 26A:
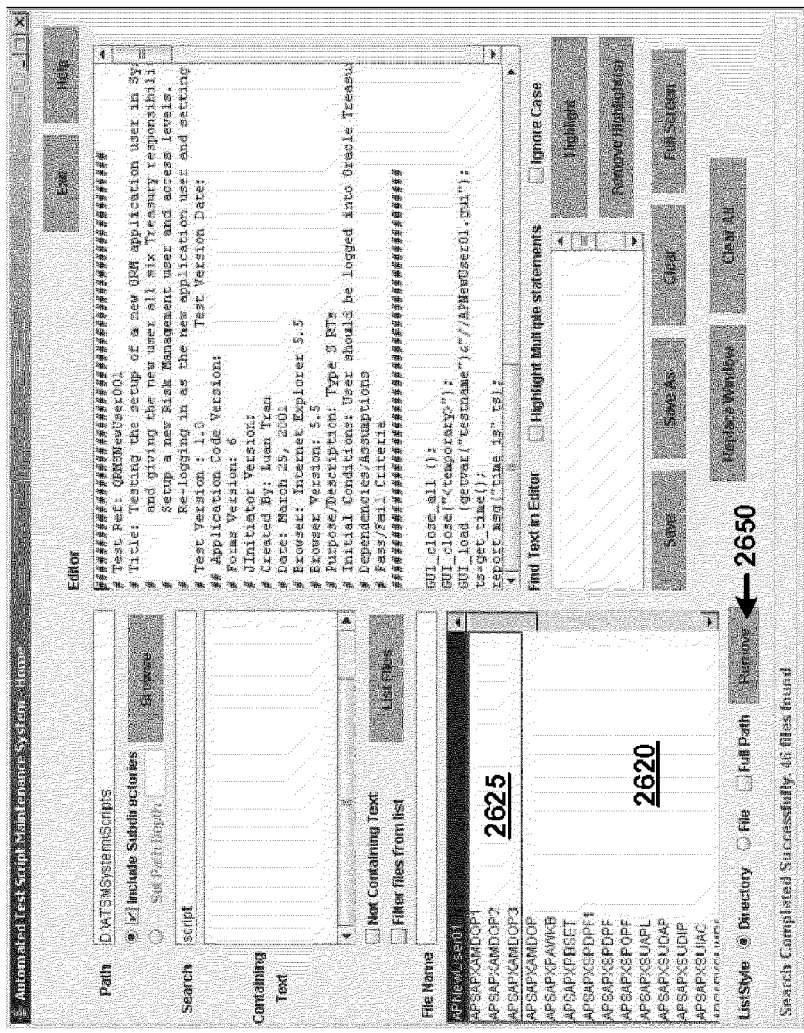
FIG. 26A depicts a user interface to select files for removal from a list of files in one embodiment.
Figure 26B:
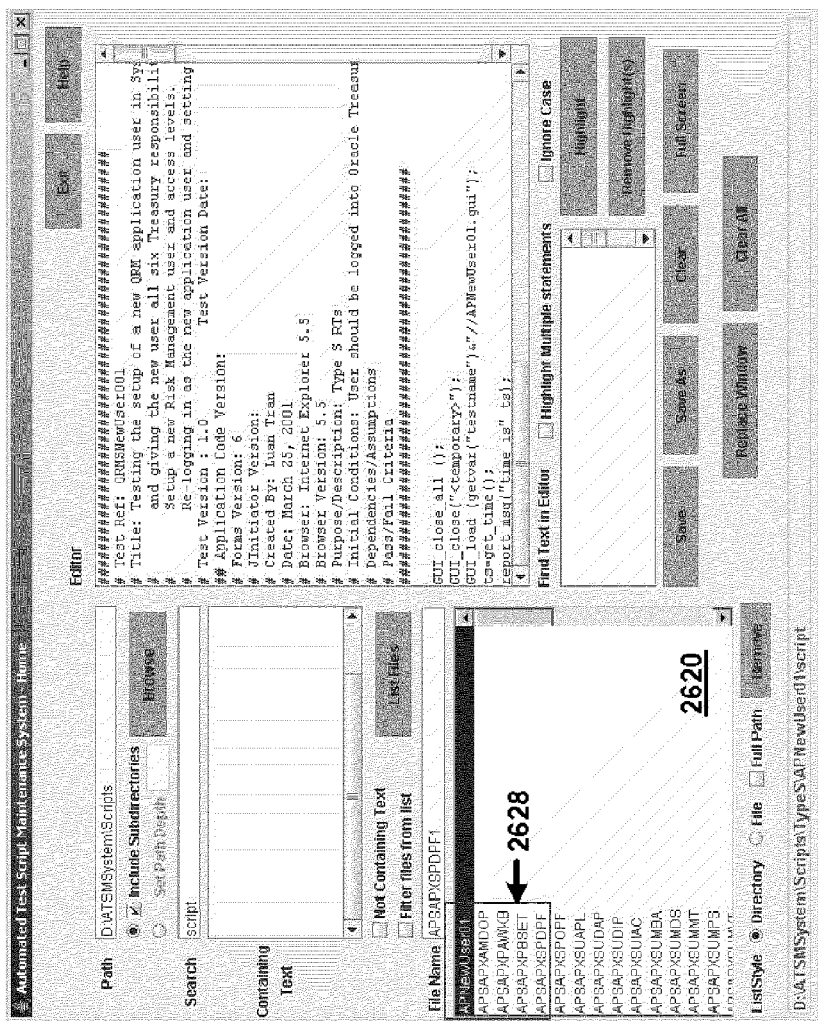
FIG. 26B depicts the results after the removal effected in FIG. 26A.

FIGS. 26A and 26B together illustrate a user interface to remove selected files from a list of files in one embodiment. Each of the figures is described in detail below.

FIG. 26A depicts a user interface to select files for removal from a list of files in one embodiment. FIG. 26A contains file list 2620 (containing lines 2625) and remove button 2650.

Script maintenance system displays a list of files in file list 2620 as per step 2520. A user selects a number of files (lines 2625) from file list 2620 for removal and clicks on remove button 2650 as per steps 2540 and 2560 respectively. Even though the selected list is shown containing contiguous entries only, a user may select files in dis-contiguous (or separated) positions as well, using a suitable interface.

FIG. 26B depicts the results after the removal effected in FIG. 26A. FIG. 26B contains file list 2620 (containing lines 2628). The user on clicking remove button 2650, script maintenance system displays (lines 2628) the files which are in the displayed set of files and not in the selected list of files as per step 2580. It may be observed that the content of line 2628 does not contain the content of lines 2625 which specified the files to be removed.

Though several features are described in isolation, it should be appreciated that the features can be combined in a common user interface. Thus, the screen shots in the Figures above illustrate such a common interface in an example embodiment.

27. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of enabling a user to manage a plurality of files, wherein each of said plurality of files belongs to a corresponding one of a plurality of directories, wherein said plurality of directories are organized in a hierarchy in a plurality of levels, said method comprising:

enabling said user to provide as inputs on a display, a search string, a search directory and a depth limit, wherein said search directory is contained in said plurality of directories;

receiving said search string, said search directory and said depth limit;

identifying a set of files in a set of directories which are within a number of levels equaling said depth limit from said search directory in said hierarchy, wherein said set of files and said set of directories are respectively contained in said plurality of files and said plurality of directories; and displaying said set of files in said display as a response to said user providing said inputs, wherein the content of each of said set of files contains said search string, wherein said depth limit is an integer and specifies said number of levels relative to said search directory such that each of said set of files belongs to one of said set of directories, which in turn are within said number of levels relative to said search directory, whereby the user is displayed only those of said plurality of files containing the matching search string and being within said number of levels relative to the search directory.

2. The method of claim 1, wherein said user provides said search directory and said integer as inputs on a user interface provided using a display, wherein said identifying comprises examining the content of only those files belonging to any of said set of directories which are within said number of levels in said hierarchy, wherein a file is determined to be one of said set of files if the content of the file contains said search string, wherein said examining is performed upon said user providing said inputs, whereby said set of files are identified without having to examine the rest of said plurality of files.

3. The method of claim 1, wherein said displaying displays a number of files in said set of files in said display.

4. The method of claim 1, further comprising receiving an option indicating whether a directory alone should be displayed or the list of files should be displayed, wherein said displaying displays on said display only a corresponding directory name of directories together containing said set of files in said display if said option indicates that said directory alone should be displayed, and wherein said displaying displays on said display the name of each of said set of files and the name of the directory in which the file is present if said option indicates that the list of files should be displayed.

5. A method of enabling a user to manage a plurality of files, wherein each of said plurality of files belongs to a corresponding one of a plurality of directories and has a corresponding one of a plurality of contents, said method comprising:

receiving a set of directories and a search string containing a plurality of lines of text, wherein said set of directories is contained in said plurality of directories; and identifying a set of files belonging to any of said set of directories, wherein the content of each of said set of files contains said search string.

6. The method of claim 5, wherein said user provides said set of directories and said search string as inputs on a user interface of a display, said method further comprising displaying said set of files in said display as a response to said user providing said inputs.

7. The method of claim 6, wherein said plurality of directories are organized in a hierarchy in a plurality of levels, wherein said receiving receives a search directory and a depth limit, wherein said set of directories include said search directory and sub-directories of said search directory which are within a number of levels equal to said depth limit from said search directory in said hierarchy, wherein said depth limit is an integer, wherein said identifying comprises examining content of each file belonging to any of said set of directories, wherein a file is determined to be one of said set of files if the content of the file contains said search string, and wherein said examining is performed in response to said receiving.

8. The method of claim 5, wherein said receiving receives a search directory and an option indicating whether subdirectories under said search directory are also to be included, wherein said set of directories include said search directory and also said subdirectories if said option indicates that subdirectories under said search directory are to be included.

9. The method of claim 5, wherein said identifying ignores white space at the beginning and end of each of said plurality of lines of text in determining said set of files.

10. The method of claim 5, further comprising providing a user interface in which said user enters each of said plurality of lines of text on separate lines of a display.

11. A method of enabling a user to manage a plurality of files, wherein each of said plurality of files belongs to a corresponding one of a plurality of directories and has a corresponding one of a plurality of contents, said method comprising:

displaying a set of files in a display, wherein said set of files is contained in said plurality of files and there is at least one file that is contained in said plurality of files that is not contained in said set of files;

enabling said user to specify a search string and a data indicating whether or not the search is to be conducted only in said set of files displayed in said display, wherein said user specifies said search string and said data associated with said set of files presently displayed on said display;

receiving said search string and said data;

identifying a first subset of files contained only in said set of files displayed in said display but not in those of said plurality of files not contained in said set of files, if the received data indicates that the search is to be conducted only in said set of files displayed in said display; and identifying another subset of files contained in said plurality of files if the received data does not indicate that the search is to be conducted only in said set of files displayed in said display, wherein said another subset of files contains at least one file not contained in said set of files, wherein the content of each of said first subset of files and said another set of files contains said search string, whereby said user can search for said search string within presently displayed files.

12. The method of claim 11, further comprising displaying said first subset of files in said display as a response to receiving said search string and said data.

13. The method of claim 11, wherein said receiving receives an option indicating whether the search is for not containing the search string and said identifying identifies each of said first subset of files whose content does not contain said search string if said option indicates the search is for not containing the search string.

14. The method of claim 12, further comprising:

receiving a second search string and said data;

identifying a second subset of files contained in said first subset of files, wherein the content of each of said second subset of files contains said second search string.

15. The method of claim 14, further comprising displaying said second subset of files in said display.

16. The method of claim 14, wherein said receiving said second search string receives a second option indicating whether the search is for not containing the search string and said identifying said second subset of files identifies each of said second subset of files whose content does not contain said second search string if said second option indicates the search is for not containing the search string.

17. A non-transitory computer readable storage medium storing one or more sequences of instructions for causing a system to enable a user to manage a plurality of files, wherein each of said plurality of files belongs to a corresponding one of a plurality of directories, wherein said plurality of directories are organized in a hierarchy in a plurality of levels, wherein execution of said one or more sequences of instructions by one or more processors contained in said system causes said system to perform the actions of:

enabling said user to provide as inputs on a display, a search string, a search directory and a depth limit, wherein said search directory is contained in said plurality of directories;

receiving said search string, said search directory and said depth limit;

identifying a set of files in a set of directories which are within a number of levels equaling said depth limit from said search directory in said hierarchy, wherein said set of files and said set of directories are respectively contained in said plurality of files and said plurality of directories; and displaying said set of files in said display as a response to said user providing said inputs, wherein the content of each of said set of files contains said search string, wherein said depth limit is an integer and specifies said number of levels relative to said search directory such that each of said set of files belongs to one of said set of directories, which in turn are within said number of levels relative to said search directory, whereby the user is displayed only those of said plurality of files containing the matching search string and being within said number of levels relative to the search directory.

18. The non-transitory computer readable medium of claim 17, wherein said user provides said search directory and said integer as inputs on a user interface provided using a display, wherein said identifying comprises examining the content of only those files belonging to any of said set of directories which are within said number of levels in said hierarchy, wherein a file is determined to be one of said set of files if the content of the file contains said search string, wherein said examining is performed upon said user providing said inputs.

19. The non-transitory computer readable medium of claim 17, wherein said displaying displays a number of files in said set of files in said display.

20. The non-transitory computer readable medium of claim 17, said actions further comprising receiving an option indicating whether a directory alone should be displayed or the list of files should be displayed,
   wherein said displaying displays on said display only a corresponding directory name of directories together containing said set of files in said display if said option indicates that said directory alone should be displayed, and
   wherein said displaying displays on said display the name of each of said set of files and the name of the directory in which the file is present if said option indicates that the list of files should be displayed.

21. A non-transitory computer readable storage medium storing one or more sequences of instructions for causing a system to enable a user to manage a plurality of files, wherein each of said plurality of files belongs to a corresponding one of a plurality of directories and has a corresponding one of a plurality of contents, wherein execution of said one or more sequences of instructions by one or more processors contained in said system causes said system to perform the actions of:
   receiving a set of directories and a search string containing a plurality of lines of text, wherein said set of directories is contained in said plurality of directories; and
   identifying a set of files belonging to any of said set of directories, wherein the content of each of said set of files contains said search string.

22. The non-transitory computer readable medium of claim 21, wherein said user provides said set of directories and said search string as inputs on a user interface of a display, said actions further comprising displaying said set of files in said display as a response to said user providing said inputs.

23. The non-transitory computer readable medium of claim 22, wherein said plurality of directories are organized in a hierarchy in a plurality of levels, wherein said receiving receives a search directory and a depth limit, wherein said set of directories include said search directory and sub-directories of said search directory which are within a number of levels equal to said depth limit from said search directory in said hierarchy,
   wherein said depth limit is an integer,
   wherein said identifying comprises examining content of each file belonging to any of said set of directories, wherein a file is determined to be one of said set of files if the content of the file contains said search string, and wherein said examining is performed in response to said receiving.

24. The non-transitory computer readable medium of claim 21, wherein said receiving receives a search directory and an option indicating whether subdirectories under said search directory are also to be included, wherein said set of directories include said search directory and also said subdirectories if said option indicates that subdirectories under said search directory are to be included.

25. The non-transitory computer readable medium of claim 21, wherein said identifying ignores white space at the beginning and end of each of said plurality of lines of text in determining said set of files.

26. The non-transitory computer readable medium of claim 21, said actions further comprising providing a user interface in which said user enters each of said plurality of lines of text on separate lines of a display.

27. A non-transitory computer readable storage medium storing one or more sequences of instructions for causing a system to enable a user to manage a plurality of files, wherein each of said plurality of files belongs to a corresponding one of a plurality of directories and has a corresponding one of a plurality of contents, wherein execution of said one or more sequences of instructions by one or more processors contained in said system causes said system to perform the actions of:
   displaying a set of files in a display, wherein said set of files is contained in said plurality of files and there is at least one file that is contained in said plurality of files that is not contained in said set of files;
   enabling said user to specify a search string and a data indicating whether or not the search is to be conducted only in said set of files displayed in said display, wherein said user specifies said search string and said data associated with said set of files presently displayed on said display;
   receiving said search string and said data;
   identifying a first subset of files contained only in said set of files displayed in said display but not in those of said plurality of files not contained in said set of files, if the received data indicates that the search is to be conducted only in said set of files displayed in said display; and
   identifying another subset of files contained in said plurality of files if the received data does not indicate that the search is to be conducted only in said set of files displayed in said display, wherein said another subset of files contains at least one file not contained in said set of files,
   wherein the content of each of said first subset of files and said another set of files contains said search string,
   whereby said user can search for said search string within presently displayed files.

28. The non-transitory computer readable medium of claim 27, further comprising displaying said first subset of files in said display as a response to receiving said search string and said data.

29. The non-transitory computer readable medium of claim 27, wherein said receiving receives an option indicating whether the search is for not containing the search string and said identifying identifies each of said first subset of files whose content does not contain said search string if said option indicates the search is for not containing the search string.

30. The non-transitory computer readable medium of claim 28, said actions further comprising:
   receiving a second search string and said data;
   identifying a second subset of files contained in said first subset of files, wherein the content of each of said second subset of files contains said second search string.

31. The non-transitory computer readable medium of claim 30, said actions further comprising displaying said second subset of files in said display.

32. The non-transitory computer readable medium of claim 30, wherein said receiving said second search string receives a second option indicating whether the search is for not containing the search string and said identifying said second subset of files identifies each of said second subset of files whose content does not contain said second search string if said second option indicates the search is for not containing the search string.

33. A digital processing system enabling a user to manage a plurality of files, wherein each of said plurality of files belongs to a corresponding one of a plurality of directories, wherein said plurality of directories are organized in a hierarchy in a plurality of levels, said digital processing system comprising:
    a memory to store instructions; and
    a processor to retrieve said instructions from said memory and execute the retrieved instructions, wherein execution of the retrieved instructions causes said digital processing system to perform the actions of:
        enabling said user to provide as inputs on a display, a search string, a search directory and a depth limit, wherein said search directory is contained in said plurality of directories;
        receiving said search string, said search directory and said depth limit;
        identifying a set of files in a set of directories which are within a number of levels equaling said depth limit from said search directory in said hierarchy, wherein said set of files and said set of directories are respectively contained in said plurality of files and said plurality of directories; and
        displaying said set of files in said display as a response to said user providing said inputs,
    wherein the content of each of said set of files contains said search string,
    wherein said depth limit is an integer and specifies said number of levels relative to said search directory such that each of said set of files belongs to one of said set of directories, which in turn are within said number of levels relative to said search directory,
    whereby the user is displayed only those of said plurality of files containing the matching search string and being within said number of levels relative to the search directory.

34. The digital processing system of claim 33, wherein said user provides said search directory and said integer as inputs on a user interface provided using a display,
    wherein said identifying comprises examining the content of only those files belonging to any of said set of directories which are within said number of levels in said hierarchy, wherein a file is determined to be one of said set of files if the content of the file contains said search string, wherein said examining is performed upon said user providing said inputs,
    whereby said set of files are identified without having to examine the rest of said plurality of files.

35. The digital processing system of claim 33, wherein said displaying displays a number of files in said set of files in said display.

36. The digital processing system of claim 33, further comprising receiving an option indicating whether a directory alone should be displayed or the list of files should be displayed,
    wherein said displaying displays on said display only a corresponding directory name of directories together containing said set of files in said display if said option indicates that said directory alone should be displayed, and
    wherein said displaying displays on said display the name of each of said set of files and the name of the directory in which the file is present if said option indicates that the list of files should be displayed.

37. A digital processing system enabling a user to manage a plurality of files, wherein each of said plurality of files belongs to a corresponding one of a plurality of directories and has a corresponding one of a plurality of contents, said digital processing system comprising:
    a memory to store instructions; and
    a processor to retrieve said instructions from said memory and execute the retrieved instructions, wherein execution of the retrieved instructions causes said digital processing system to perform the actions of:
        receiving a set of directories and a search string containing a plurality of lines of text, wherein said set of directories is contained in said plurality of directories; and
        identifying a set of files belonging to any of said set of directories, wherein the content of each of said set of files contains said search string.

38. The digital processing system of claim 37, wherein said user provides said set of directories and said search string as inputs on a user interface of a display, said actions further comprising displaying said set of files in said display as a response to said user providing said inputs.

39. The digital processing system of claim 38, wherein said plurality of directories are organized in a hierarchy in a plurality of levels, wherein said receiving receives a search directory and a depth limit, wherein said set of directories include said search directory and sub-directories of said search directory which are within a number of levels equal to said depth limit from said search directory in said hierarchy,
    wherein said depth limit is an integer,
    wherein said identifying comprises examining content of each file belonging to any of said set of directories, wherein a file is determined to be one of said set of files if the content of the file contains said search string, and wherein said examining is performed in response to said receiving.

40. The digital processing system of claim 37, wherein said receiving receives a search directory and an option indicating whether subdirectories under said search directory are also to be included, wherein said set of directories include said search directory and also said subdirectories if said option indicates that subdirectories under said search directory are to be included.

41. The digital processing system of claim 37, wherein said identifying ignores white space at the beginning and end of each of said plurality of lines of text in determining said set of files.

42. The digital processing system of claim 37, further comprising providing a user interface in which said user enters each of said plurality of lines of text on separate lines of a display.

43. A digital processing system enabling a user to manage a plurality of files, wherein each of said plurality of files belongs to a corresponding one of a plurality of directories and has a corresponding one of a plurality of contents, said digital processing system comprising:
    a memory to store instructions; and
    a processor to retrieve said instructions from said memory and execute the retrieved instructions, wherein execution of the retrieved instructions causes said digital processing system to perform the actions of:
        displaying a set of files in a display, wherein said set of files is contained in said plurality of files and there is at least one file that is contained in said plurality of files that is not contained in said set of files;
        enabling said user to specify a search string and a data indicating whether or not the search is to be conducted only in said set of files displayed in said display, wherein said user specifies said search string and said data associated with said set of files presently displayed on said display;

receiving said search string and said data;

identifying a first subset of files contained only in said set of files displayed in said display but not in those of said plurality of files not contained in said set of files, if the received data indicates that the search is to be conducted only in said set of files displayed in said display; and identifying another subset of files contained in said plurality of files if the received data does not indicate that the search is to be conducted only in said set of files displayed in said display, wherein said another subset of files contains at least one file not contained in said set of files, wherein the content of each of said first subset of files and said another set of files contains said search string, whereby said user can search for said search string within presently displayed files.

44. The digital processing system of claim 43, further comprising displaying said first subset of files in said display as a response to receiving said search string and said data.

45. The digital processing system of claim 43, wherein said receiving receives an option indicating whether the search is for not containing the search string and said identifying identifies each of said first subset of files whose content does not contain said search string if said option indicates the search is for not containing the search string.

46. The digital processing system of claim 44, further comprising:

receiving a second search string and said data;

identifying a second subset of files contained in said first subset of files, wherein the content of each of said second subset of files contains said second search string.

47. The digital processing system of claim 46, further comprising displaying said second subset of files in said display.

48. The digital processing system of claim 46, wherein said receiving said second search string receives a second option indicating whether the search is for not containing the search string and said identifying said second subset of files identifies each of said second subset of files whose content does not contain said second search string if said second option indicates the search is for not containing the search string.

* * * * *

UNITED STATES PATENT AND TRADEMARK OFFICE
CERTIFICATE OF CORRECTION

PATENT NO. : 8,935,290 B2
APPLICATION NO. : 11/309058
DATED : January 13, 2015
INVENTOR(S) : Ippili et al.

It is certified that error appears in the above-identified patent and that said Letters Patent is hereby corrected as shown below:

On the Title Page

On page 2, column 2, item (56) under Other Publications, line 4, delete "tast" and insert -- test --, therefor.

In the Specification

In column 15, line 46, delete "interface" and insert -- interface. --, therefor.

Signed and Sealed this
Eighth Day of September, 2015

Michelle K. Lee
*Director of the United States Patent and Trademark Office*